(12) United States Patent
Regan et al.

(10) Patent No.: US 9,489,457 B2
(45) Date of Patent: Nov. 8, 2016

(54) METHODS AND APPARATUS FOR INITIATING AN ACTION

(75) Inventors: Marc W. Regan, Cambridge, MA (US); Vladimir Sejnoha, Lexington, MA (US); Gunnar Evermann, Boston, MA (US); Sean P. Brown, San Francisco, CA (US); Stephen W. Laverty, Somerville, MA (US); Jeremy A. Slater, Groton, MA (US); John R. Watson, Boston, MA (US); Peter K. Lyons, Chelmsford, MA (US); Ryan S. LaSante, Littleton, MA (US)

(73) Assignee: Nuance Communications, Inc., Burlington, MA (US)

(*) Notice: Subject to any disclaimer, the term of this patent is extended or adjusted under 35 U.S.C. 154(b) by 104 days.

(21) Appl. No.: 13/182,605

(22) Filed: Jul. 14, 2011

(65) Prior Publication Data

US 2013/0018867 A1     Jan. 17, 2013

(51) Int. Cl.
*G06F 17/30* (2006.01)
*G06F 9/445* (2006.01)

(52) U.S. Cl.
CPC ......... *G06F 17/30864* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 8,171,489 B2 * | 5/2012 | Liu et al. | 718/108 |
| 8,239,366 B2 | 8/2012 | Sejnoha et al. | |
| 8,341,142 B2 | 12/2012 | Sejnoha et al. | |
| 8,635,201 B2 | 1/2014 | Regan et al. | |
| 8,666,963 B2 | 3/2014 | Sejnoha et al. | |
| 2002/0046299 A1 * | 4/2002 | Lefeber et al. | 709/318 |
| 2004/0193424 A1 * | 9/2004 | Dames et al. | 704/270.1 |
| 2006/0129530 A1 | 6/2006 | Beavers et al. | |
| 2006/0136375 A1 | 6/2006 | Cox et al. | |
| 2006/0195443 A1 * | 8/2006 | Franklin et al. | 707/5 |
| 2007/0094256 A1 * | 4/2007 | Hite et al. | 707/6 |
| 2007/0174244 A1 | 7/2007 | Jones | |
| 2008/0016147 A1 | 1/2008 | Morimoto | |
| 2008/0021887 A1 | 1/2008 | Brinson, Jr. et al. | |
| 2008/0194276 A1 * | 8/2008 | Lin et al. | 455/466 |

(Continued)

FOREIGN PATENT DOCUMENTS

EP     1 072 984 A2     1/2001
EP     1 148 412 A2    10/2001

OTHER PUBLICATIONS

Meng. W. et al., "Building Efficient and Effective Metasearch Engines," ACM Computing Surveys, Mar. 1, 2002, pp. 48-89, vol. 34, No. 1.

(Continued)

*Primary Examiner* — Jay Morrison
(74) *Attorney, Agent, or Firm* — Wolf, Greenfield & Sacks, P.C.

(57) ABSTRACT

Some embodiments relate to techniques for receiving a query from a device, the query comprising content; determining based at least in part on the content of the query that an application is to be launched on the device; and causing the device to launch the application using at least some information determined from the content of the query. Some embodiments relate to techniques for receiving a free-form query from a user; transferring a representation of the query to at least one computer; and receiving from the at least one computer at least one instruction to launch an application on the device.

42 Claims, 13 Drawing Sheets

(56) References Cited

U.S. PATENT DOCUMENTS

| | | |
|---|---|---|
| 2008/0201304 A1 | 8/2008 | Sue |
| 2009/0182715 A1* | 7/2009 | Falkenberg ............... 707/3 |
| 2010/0036829 A1* | 2/2010 | Leyba ...................... 707/5 |
| 2010/0287611 A1* | 11/2010 | Blom et al. .............. 726/21 |
| 2010/0312782 A1 | 12/2010 | Li et al. |
| 2011/0098917 A1* | 4/2011 | LeBeau et al. ........... 701/201 |
| 2011/0295776 A1* | 12/2011 | Donato et al. ........... 706/12 |
| 2012/0059655 A1 | 3/2012 | Cartales |
| 2012/0059658 A1 | 3/2012 | Sejnoha et al. |
| 2012/0059810 A1 | 3/2012 | Sejnoha et al. |
| 2012/0059813 A1 | 3/2012 | Sejnoha et al. |
| 2012/0059814 A1 | 3/2012 | Sejnoha et al. |
| 2012/0060113 A1 | 3/2012 | Sejnoha et al. |
| 2012/0084292 A1* | 4/2012 | Liang et al. .............. 707/741 |
| 2012/0197857 A1* | 8/2012 | Huang et al. ............. 707/706 |
| 2012/0259636 A1 | 10/2012 | Sejnoha et al. |
| 2012/0284247 A1* | 11/2012 | Jiang et al. .............. 707/706 |
| 2013/0018863 A1 | 1/2013 | Regan et al. |
| 2013/0018864 A1 | 1/2013 | Regan et al. |
| 2013/0018865 A1 | 1/2013 | Regan et al. |
| 2013/0019202 A1 | 1/2013 | Regan et al. |
| 2013/0086025 A1 | 4/2013 | Hebert |
| 2013/0086026 A1 | 4/2013 | Hebert |
| 2013/0086027 A1 | 4/2013 | Hebert |
| 2013/0086028 A1 | 4/2013 | Hebert |
| 2013/0086029 A1 | 4/2013 | Hebert |
| 2013/0124495 A1 | 5/2013 | Sejnoha et al. |
| 2013/0144857 A1 | 6/2013 | Sejnoha et al. |

OTHER PUBLICATIONS

International Search Report and Written Opinion for International application No. PCT/US2011/050669 mailed Sep. 26, 2012.
U.S. Appl. No. 12/877,690, filed Sep. 8, 2010, Sejnoha et al.
U.S. Appl. No. 12/877,347, filed Sep. 8, 2010, Cartles.
U.S. Appl. No. 12/877,549, filed Sep. 8, 2010, Sejnoha et al.
U.S. Appl. No. 13/527,500, filed Jun. 19, 2012, Sejnoha et al.
U.S. Appl. No. 12/877,647, filed Sep. 8, 2010, Sejnoha et al.
U.S. Appl. No. 12/877,440, filed Sep. 8, 2010, Sejnoha et al.
U.S. Appl. No. 12/877,765, filed Sep. 8, 2010, Sejnoha et al.
U.S. Appl. No. 13/182,512, filed Jul. 14, 2011, Regan et al.
U.S. Appl. No. 13/182,599, filed Jul. 14, 2011, Regan et al.
U.S. Appl. No. 13/182,615, filed Jul. 14, 2011, Regan et al.
U.S. Appl. No. 13/221,332, filed Aug. 30, 2011, Sejnoha et al.

\* cited by examiner http://www.google.com/search?hl=en&source=hp&q=miles+davis
http://www.bing.com/search?q=miles+davis
Http://en.wikipedia.org/w/index.php?search=miles+davis

*FIG. 9*

METHODS AND APPARATUS FOR INITIATING AN ACTION

BACKGROUND

1. Field of Invention

The techniques described herein are directed generally to the field of search queries on a computer network.

2. Description of the Related Art

The Internet is a global system of interconnected computer networks that provide access to a vast array of information. The World Wide Web (WWW) is an information sharing model built on top of the Internet, in which a system of interlinked hypertext documents are accessed using particular protocols (i.e., the Hypertext Transfer Protocol and its variants).

Because of the enormous volume of information available via the WWW and the Internet, and because the available information is distributed across an enormous number of independently owned and operated networks and servers, locating desired content on the WWW and the Internet presents challenges.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a web crawler that browses the WWW in an automated fashion (e.g., following every hyperlink that it comes across in each web page that it browses). The retrieved web pages and/or content are analyzed and information about the web pages or content is stored in an index. When a user issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's query.

There are at least two general types of search engines accessible via the Internet: general-purpose search engines and site-specific search engines. As used herein, the term "general-purpose search engine" means a search engine that provides search results that include web pages and/or content (or hyperlinks to web pages and/or content) hosted on at least two different and independent web sites or domains. General purpose search engines attempt to index and provide search results from content distributed across a wide swath of the Internet. Examples of general purpose search engines include Google™, operated by Google, Inc. of Mountain View, Calif.; Yahoo!™, operated by Yahoo!, Inc. of Sunnyvale, Calif.; and Bing™, operated by Microsoft Corp. of Redmond, Wash.

As used herein, the term "site-specific search engine" means a search engine that provides search results that include web pages and/or content (or hyperlinks to web pages and/or content) hosted on only one web site or domain. Site-specific search engines are frequently used by operators of web sites to allow users to find specific web pages or content on their web sites. For example, the web site of an online retailer (or "e-tailer") may include a site-specific search engine that facilitates a user locating web pages for products sold by the retailer.

SUMMARY

Some embodiments of the invention provide a method, performed by at least one computer, comprising acts of: (A) receiving a query from a device, the query comprising content; (B) determining based at least in part on the content of the query that an application is to be launched on the device; and (C) causing the device to launch the application using at least some information determined from the content of the query.

Some embodiments of the invention provide a method, performed by a device comprising an application, comprising acts of: (A) receiving a free-form query from a user; (B) transferring a representation of the query to at least one computer; (C) receiving from the at least one computer at least one instruction to launch an application on the device.

Some embodiments provide a method, performed by a device comprising first and second applications, comprising acts of: (A) receiving, from a user, a natural language input to the first application; (B) transferring a representation of the natural language input to at least one computer; (C) receiving from the at least one computer at least one instruction to launch the second application.

Some embodiments provide at least one computer-readable medium having instructions thereon which, when executed by at least one computer, perform a method comprising acts of: (A) receiving a query from a device, the query comprising content; (B) determining based at least in part on the content of the query that an application is to be launched on the device; and (C) causing the device to launch the application using at least some information determined from the content of the query.

Some embodiments provide at least one computer-readable medium having instructions recorded thereon which, when executed by a device comprising an application, perform a method comprising acts of: (A) receiving a free-form query from a user; (B) transferring a representation of the query to at least one computer; (C) receiving from the at least one computer at least one instruction to launch an application on the device.

Some embodiments provide at least one computer-readable medium having instructions recorded thereon which, when executed by a device comprising first and second applications, perform a method comprising acts of: (A) receiving, from a user, a natural language input to the first application; (B) transferring a representation of the natural language input to at least one computer; (C) receiving from the at least one computer at least one instruction to launch the second application.

Some embodiments provide at least one computer, comprising: at least one processor, programmed to: receive a query from a device, the query comprising content; determine based at least in part on the content of the query that an application is to be launched on the device; and cause the device to launch the application using at least some information determined from the content of the query.

Some embodiments provide a device, comprising: at least one processor; an application, executed by the at least one processor, that: receives a free-form query from a user; transfers a representation of the query to at least one computer; receives from the at least one computer at least one instruction to launch an application on the device.

Some embodiments provide a device, comprising: at least one processor; and first and second applications, executed by the at least one processor; wherein the first application: receives, from a user, a natural language input to the first application; transfers a representation of the natural language input to at least one computer; receives from the at least one computer at least one instruction to launch the second application.

BRIEF DESCRIPTION OF DRAWINGS

In the drawings:

FIG. 9 is a diagram showing Universal Resource Locators (URLs) that may be generated to query multiple search engines, in accordance with some embodiments;

DETAILED DESCRIPTION

The inventors have recognized that a given user-specified search query may indicate an interest in searching for any of several different types of information pertaining to the subject of the query. For example, for the search query "Miles Davis," the user may be interested in obtaining biographical information about Miles Davis, listening to samples of or purchasing Miles Davis' music, and/or social networking with others who are interested in Miles Davis. Historically, to obtain these different types of information, a user may have had to enter the search string "Miles Davis" into three different search engines. For example, the user might have entered this search string into the search engine for an encyclopedia web site to obtain biographical information, into the search engine for a web site that sells music to listen to or purchase music, and into the search engine of a social networking site to connect with others. The inventors have recognized that this process is often time consuming and laborious, as the user must navigate to multiple different web sites (and potentially manage multiple different browser windows or tabs) and enter the same search string repeatedly.

Figure 1:
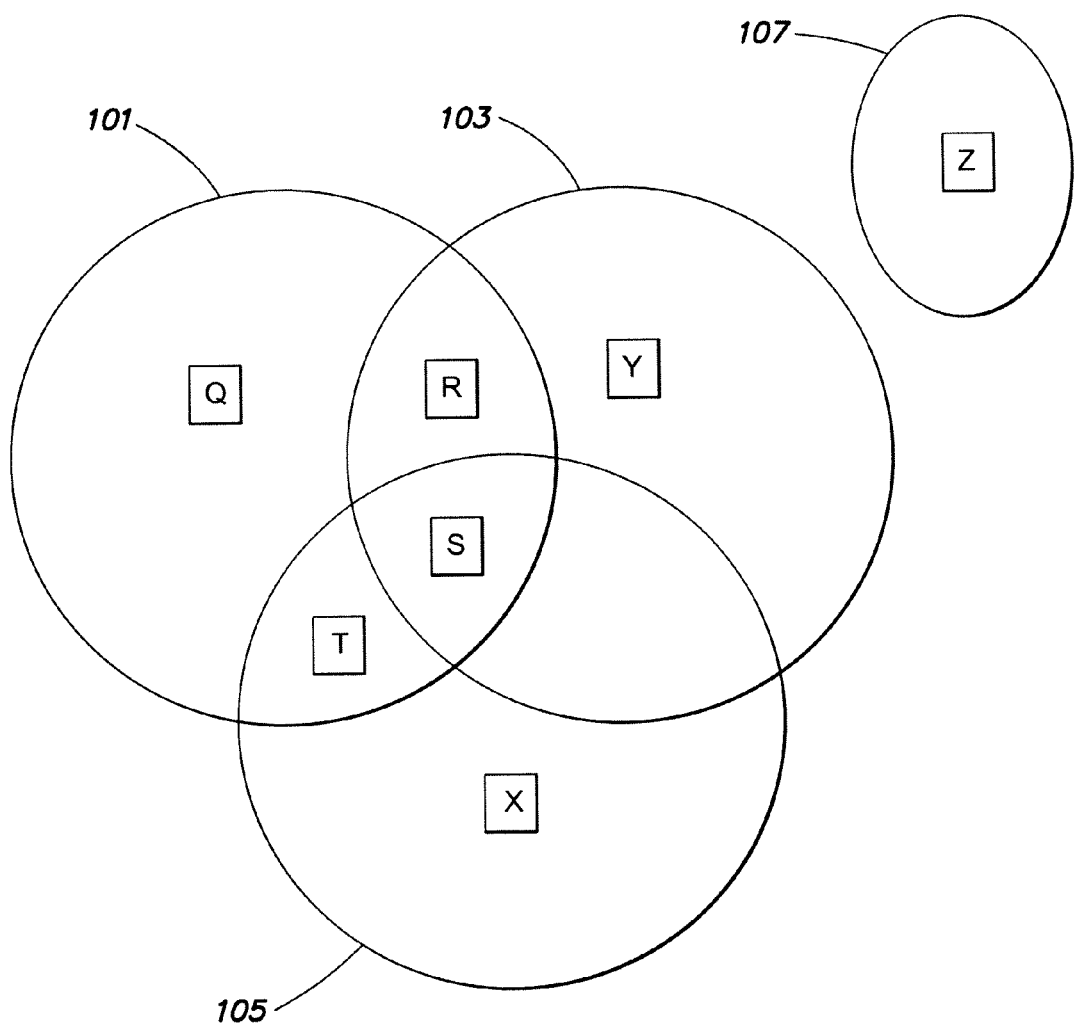
FIG. 1 is a Venn diagram showing sets of search results from multiple different search engines.

The inventors have also recognized that, because different search engines index web pages and/or content in different ways, index different universes of content, and/or use different algorithms to determine which web pages and/or content best match a particular search query, different search engines may provide different (though possibly overlapping) sets of search results in response to the same search query. This concept is illustrated by the Venn diagram in FIG. 1. Each set depicted in the Venn diagram of FIG. 1 represents the search results from one of four hypothetical search engines (i.e., search engine one, search engine two, search engine three, and search engine four) provided in response to a user-provided search query for the keywords "Miles Davis." In FIG. 1, set 101 includes results provided from search engine one and includes search results "Q," "R," "S," and "T." Set 103 includes results provided from search engine two and includes results "R," "S," and "Y." Set 105 includes results provided from search engine three and includes results "S," "T," and "X." Set 107 includes results provided from search engine four and includes result "Z." As shown in FIG. 1, some search results are included only in one of the sets and, as such, are returned from only one of the four search engines, while other search results are included in multiple of the sets and, as such, are returned from two or more of the search engines.

When a search engine returns a set of search results in response to a search query, the search engine generally returns the results in an ordered list. The list may be ordered by relevance, may be ordered based on money paid for higher positions in the search results, and/or may be ordered based on other criteria. For example, web pages or content that a search engine has determined to be most relevant may be at the top of the list of the results, while web pages or content that the search engine has determined to be less relevant may be farther down in the list of results. As another example, a particular electronics manufacture may pay an electronics e-tailer to list its televisions higher up in the list when users enter search queries including the word "television" into the site-specific search engine for the e-tailer's web site.

The inventors have appreciated that, because different search engines use different algorithms to determine in what order web pages and/or content are to be listed in the search results, even in a situation in which two different search engines include the same web page or piece of content in their search results in response to a particular search query (e.g., "Miles Davis"), any particular web page or piece of content may be at or near the top of the list of results provided by a first of the two search engines (e.g., because the first search engine has determined the web page or piece of content to be particularly relevant in the universe of content in evaluates), but may be further down the list of results provided by a second of the two search engines (e.g., because the second of the two search engines has determined the web page or piece of content to be less relevant in the universe of content it evaluates). Similarly, some results that are listed near the top of the list of search results from the second search engine may be listed much lower in the list of results provided by the first engine. The inventors have recognized that users are more likely to notice and access results that are near the top of the list. Thus, by using only one of the two search engines, a user may not notice or access results that may be highly relevant to the user.

As such, the inventors have recognized that issuing a user-specified search query to only a single search engine increases the chances of some web pages and/or pieces of content that are potentially relevant not being included the search results or being listed low enough in the returned list of search results that the user disregards them. In addition, the inventors have recognized that issuing such a search query to only a single search engine may limit the content that is returned to only the type of content that is search and/or indexed by that search engine, while the user may be interested in other, different types of content pertaining to that search query.

Some conventional web-based software programs, referred to as metasearch engines or search engine aggregators, receive a user-specified search query, issue the search query to multiple search engines, receive results from each of these search engines, remove duplicates, aggregate these search results into a single list, and display this list of aggregated search results to the user. One example of such a metasearch engine is Dogpile™, operated by Infospace, Inc. of Bellevue, Wash. However, the inventors have recognized that these metasearch engines have a number of disadvantages.

First, the search engines that are queried by these metasearch engines include only general-purpose search engines, and do not include any site-specific search engines.

Second, because metasearch engines, in response to a user-specified search query, display to the user a single list of aggregated search results from a number of different search engines, the user has no ability to see which search engine provided which search result, to see how relevant each of the plurality of search engines deemed a particular search result to be, or to look at the full set of results returned from any one particular search engine.

Third, metasearch engines run on one or more servers that receive a user-specified search query issued from a browser or other software application executing on the user's client device and issue the search query from the server(s) to the plurality of search engines that are to be queried. Because a metasearch engine may receive search queries from and provide aggregated search results to a large number of users, the server(s) on which the metasearch engine operates may regularly issue a very large number of search queries to the search engines whose results it aggregates. One consequence of this is that a search engine may receive hundreds of thousands or even millions of search queries daily from the same server or IP address, and may perceive this behavior as a single user issuing an enormous number of search queries to the search engine. Many search engine operators would consider this behavior to be an abuse of the search engine service and/or a potential denial of service attack and would take action to block search queries to their search engines from an IP address issuing such a large number of queries. For this reason, a metasearch engine operator must typically obtain contractual agreements with the search engine operators whose search engine results are aggregated by the metasearch engine to allow the metasearch engine to issue a large number of search queries to these search engines.

Fourth, these metasearch engines do not provide any capability for the user to control to which search engines his or her search query is to be provided. Rather, existing metasearch engines have a fixed set of search engines to which every search query is provided. Thus, the user has no control over which search engines' results are provided in response to a search query and the metasearch engines do not perform any customization of which search engines are queries based on which user issued the search query or based on the content of the user's search query.

While some embodiments of the invention address above-discussed deficiencies of existing metasearch engines, it should be appreciated that not every embodiment addresses all of the deficiencies discussed above, and some embodiments may not address any of these deficiencies. As such, it should be understood that the invention is not limited to embodiments that address all or any of the above-described deficiencies of metasearch engines.

Some embodiments described below are directed to techniques for receiving a user-specified query comprising content and, in response to receiving the query, identifying, based at least in part on the content of the query, at least one search engine to which a representation of the query is to be submitted. For example, some embodiments of the invention are directed to determining, upon receiving a user-specified search query, the type of information which the user seeks, and customizing the search engines to which the query is submitted. This determination may, for example, be based on the content of the user's query, the location of the user when the search query was received, the user's browsing and/or query history, the browsing and/or query history of other users, any combination of the foregoing, and/or other information. Upon determining the type of information the user seeks, a representation of the query may be submitted to multiple search engines that are selected because they are known to provide access to information of that type. Thus, the search engines to which queries are sent and for which results are displayed may not be static in some embodiments, but rather may be dynamically determined, so that the search engines may vary from query to query for a particular user and/or between different users.

As a simple example, given a user's query "Tom Brady," embodiments of the invention may determine (e.g., based on the content of the query, the user's previous search and/or browsing history, etc.) that the user likely seeks information relating to sports. As such, embodiments of the invention may cause a representation of the user's query to be submitted to one or more search engines provided by sports-related websites, and cause results generated by the search engine(s) to be presented to the user.

Some embodiments of the invention are not limited to identifying only a single type of information as that which the user seeks, and may determine two or more types. Using the example query "Tom Brady" to illustrate, embodiments of the invention may also acknowledge the possibility that the user seeks celebrity-related information (e.g., based on the query's content, the user's previous search and/or browsing history, etc.). As a result, some embodiments of the invention may cause a representation of the user's query to be submitted to one or more search engines provided by celebrity-related websites, and cause results generated by the search engine(s) to be presented to the user, instead of or in addition to the results generated by sports-related websites.

In seeking to determine the intent of the user, the possibility exists that the type of information sought by the user may be incorrectly identified. To address this risk, some embodiments of the invention may submit a representation of the user's query to search engines providing access to other types of information than that which was determined that the user's query may be directed to. For example, a representation of the user's query may be submitted to one or more general-purpose search engines, and results generated by the search engine(s) may be presented to the user, in addition to the information generated by the more specific search engines (e.g., sports-related and/or celebrity-related websites in the Tom Brady example) which provide information determined to be that in which the user is likely interested. In this way, the system provides the benefit of focused and highly relevant results when it determines the user's intent correctly, while having the "safety net" of providing at least some relevant information (e.g., via the general-purpose search engine) if it determines the user's intent incorrectly.

While some embodiments that attempt to determine the user's intent provide the safety net or fallback option of returning other results returned by additional search engines, not all embodiments are limited in this respect. For example, some embodiments of the invention may only cause results generated by more specific search engines to be presented.

In some embodiments, results generated by the search engines may be arranged based on an assessment of how likely it is that each search engine provides the type of information the user seeks. For example, referring to the Tom Brady example, if it is determined that the user most likely seeks sports-related information, then results generated by one or more search engines provided by sports-related website(s) may be displayed most prominently. If it is determined to also be possible that the user seeks celebrity-related information, then results generated by one or more search engines provided by celebrity-related website(s) may be displayed less prominently than that which is provided by the sports-related websites. If the user's query is also submitted to general-purpose search engines (e.g., as a "backup option"), then the results generated by those search engines may be displayed least prominently. It should be appreciated, however, that an arrangement of results generated by various search engines in this manner is optional, and that embodiments of the invention are not limited to displaying results in a manner that is influenced by an assessment of how likely a user seeks a particular type of information.

Figure 10A:
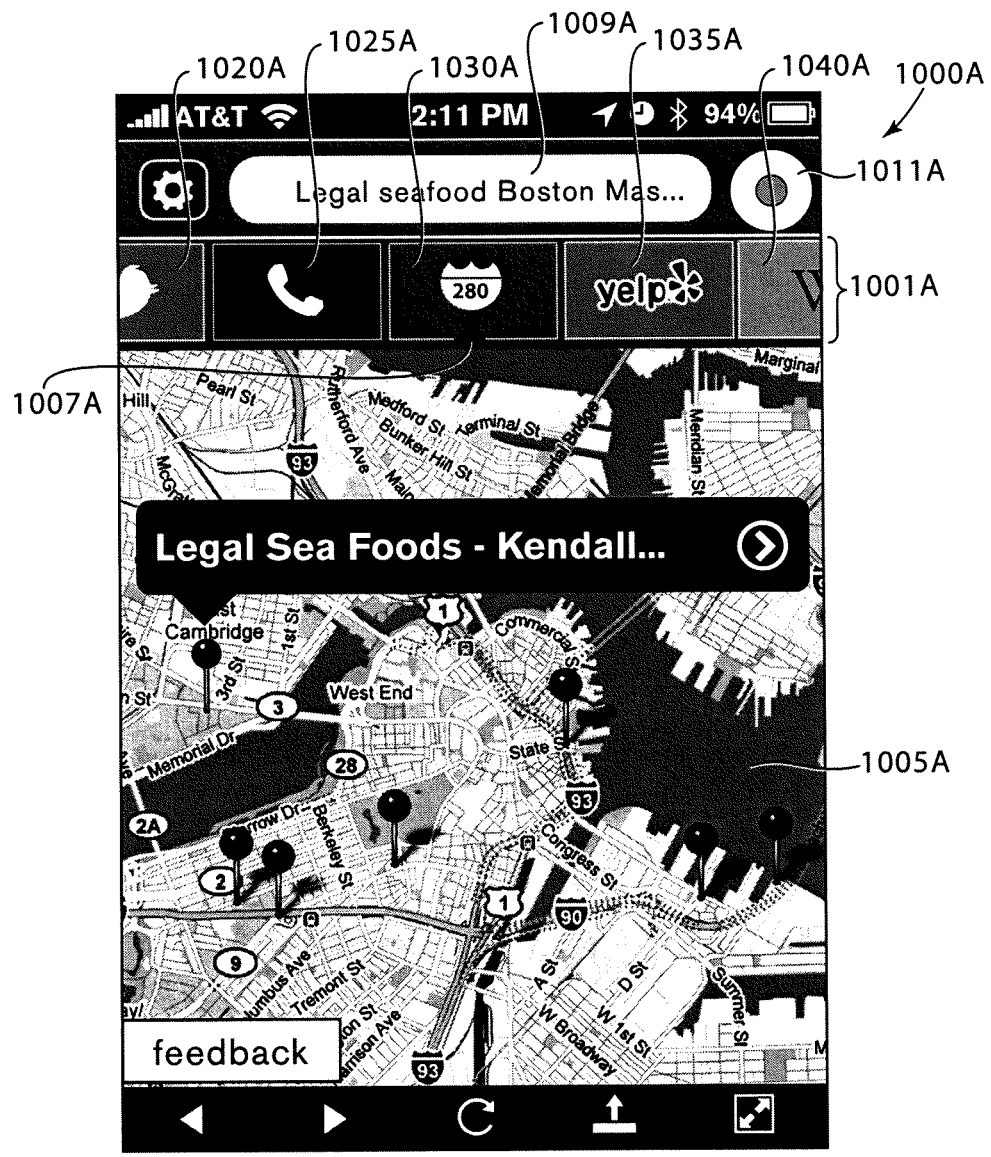
FIG. 10A is a depiction of a display of a client device in which search results from multiple search engines may be displayed.
Figure 10B:
FIG. 10B is a depiction of a display of a client device in which search results from multiple search engines may be displayed.

Displaying some results more prominently than others may be accomplished in any of numerous ways, some non-limiting examples of which are described below. In one example, results from multiple search engines may be displayed concurrently on a display which employs a carousel metaphor, in which each search engine from which results were received occupies a slot. Examples of a carousel are shown in FIGS. 10A-10B, and a commercialized example is the Dragon Search mobile phone application made available by the Assignee of this application, Nuance Communications, Inc. The user may select a particular slot to view results generated by the corresponding search engine. Using the example above to illustrate, the slots corresponding to search engines provided by sports-related websites may be displayed most prominently by, for example, placing the corresponding slots in the center of the carousel, toward the left, or in any other suitable position. The slots corresponding to the search engines provided by celebrity-related websites may, for example, be placed in slots that are deemed less prominent than those corresponding to the sports-related websites, followed by the slots corresponding to general-purpose search engines. In some embodiments, the less prominent slots may be visible when the results are initially presented, whereas in other embodiments they may not, so that the user may need to take an action (e.g., scroll) to view the results for those slots.

As should be appreciated from the foregoing, some embodiments of the invention determine, upon receiving a user's query, the type of information the user most likely seeks, and cause information of that type to be presented most prominently to the user, and may cause other types of information (e.g., determined to be less likely than the identified type but still possibly the type the user seeks) to be presented as "backup." As a result, some embodiments of the invention may be aggressive in presenting specialized information of the type identified to be most likely that which the user seeks, while also allowing for the possibility that the user seeks information that is not limited to any particular type.

Figure 2:
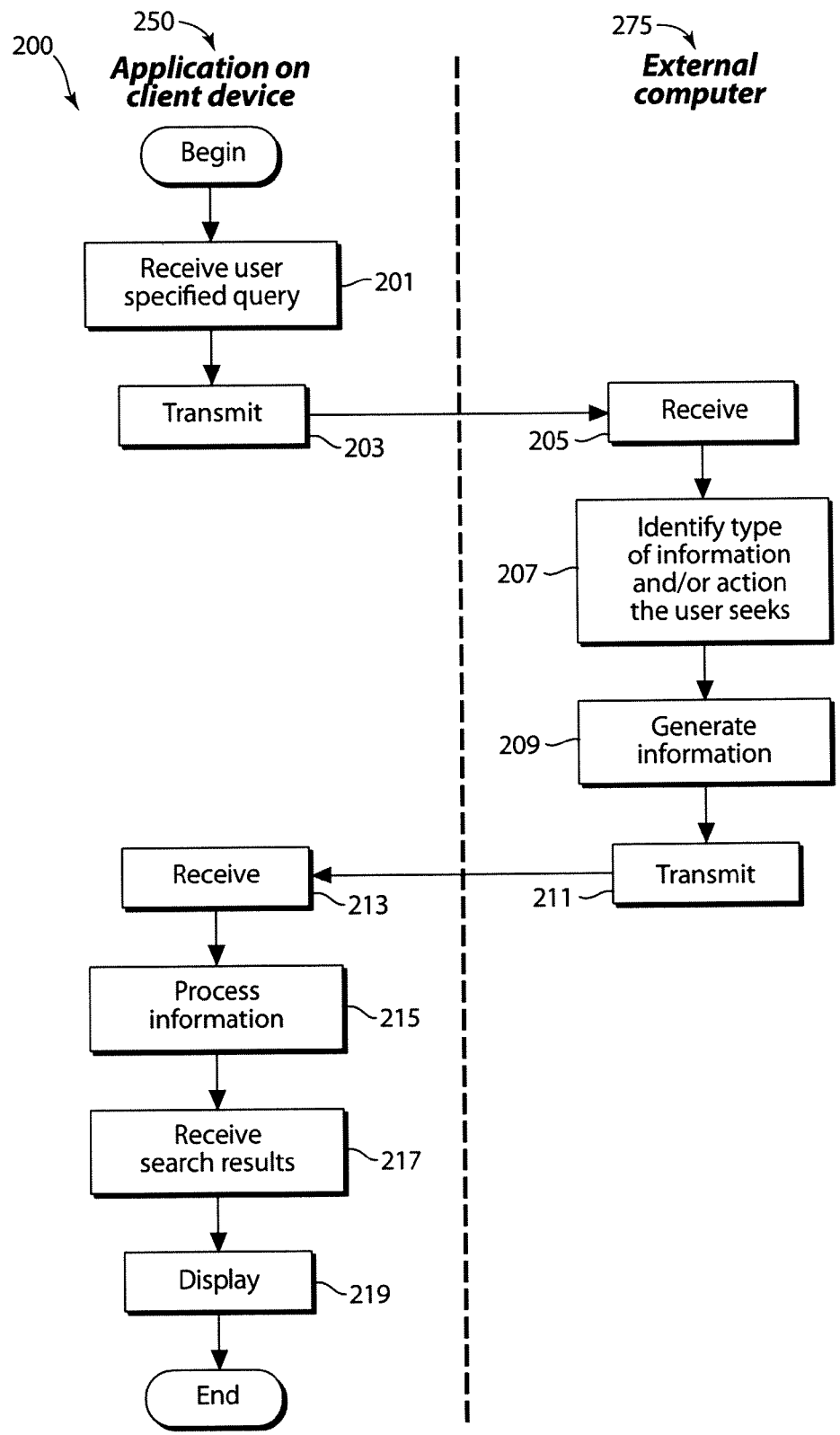
FIG. 2 is a flow chart of an illustrative process for sending search queries to and receiving search results from multiple search engines, in accordance with some embodiments.

FIG. 2 depicts an example process 200 that may be performed to determine, upon receiving a user's query, the type of information that the user likely seeks, and to present that type of information (e.g., alone or among one or more other types of information) to the user. Process 200 may, for example, be performed by an application program executing on a client device 250 employed by the user and/or a computer 275 that is external to the client device (e.g., in communication with client device 250 via a communication medium, not shown). Client device 250 may be any suitable type of computing device having hardware capable of executing an application program. Examples of client devices that may be used include a laptop or desktop personal computer, a personal digital assistant (PDA), a mobile phone (e.g., a smartphone), a server computer, and/or various other types of computing devices. External computer 275 may also include any suitable type of computing device, such as a laptop or desktop personal computer, server computer, and/or other type of computing devices. Collectively and/or individually, the client device and external computer may provide speech recognition capability, so that a user-specified query may be submitted via voice input. However, embodiments of the invention are not limited to systems having speech recognition capability, and are not limited to systems comprising mobile telephones or smartphones.

Process 200 begins in act 201, wherein an application program on client device 250 receives a user-specified query (e.g., via voice and/or text input). As discussed in greater detail below, the query may be received in any of numerous ways via any of numerous user interfaces. In the example process shown in FIG. 2, the application program executing on the client device causes a representation of the user-specified query to be transmitted to external computer 275 in act 203, which receives it in act 205 and identifies the type of information and/or action which the user seeks in act 207. As described in detail below, the representation of the query can take any of numerous forms, as can the identification of the information and/or action specified by the query. External computer 275 generates information (e.g., comprising search queries to be submitted to the identified search engines) in act 209, and transmits the information to the application program executing on the client device in act 211. After receiving the transmitted information in act 213, the application program executing on client device 250 processes the information (e.g., by issuing search queries to each identified search engine) in act 215. If act 215 includes issuing search queries to search engines, then the application program executing on client device 250 receives results generated from those queries in act 217. Results are displayed to the user in act 219. Example process 200 then completes.

It should be appreciated that example process 200 represents only one manner of implementing embodiments of the invention. For example, not all embodiments of the invention are limited to employing a client device executing an application program and an external computer, as numerous other system configurations may alternatively be employed. For example, some embodiments of the invention may receive a user-specified query, identify search engines making available the types of information the user may seek, generate search queries and display results therefrom, all on a single device. In another example, some embodiments of the invention may employ multiple computers external to the client device to identify search engines making available the types of information the user may seek and generate search queries. Variations on example process 200 may be performed by any of numerous component configurations, as embodiments of the invention are not limited in this respect.

Further, it should be appreciated that numerous variations on example process 200 are possible. For example, some variations may include one or more of acts 201-219 being performed in a different sequence than that which is described herein, may omit one or more of acts 201-219, and/or may include acts not described. Embodiments of the invention are not limited to being implemented in any particular manner.

The acts comprising example process 200 are described in detail below.

I. Receiving a User-Specified Search Query

In act 201, an application program executing on client device 250 receives user input specifying a search query. A search query may take any suitable form, and may not be bound by a predefined syntax. For example, a search query may be free-form, and comprise any information susceptible to representation via a string of one or more characters. For example, a search query may comprise a name of a person (e.g., "Tom Brady"), place (e.g., "Saratoga Springs"), thing (e.g., "New York Stock Exchange"), any combination thereof (e.g., "ski shops in Park City"), and/or otherwise convey a user's desire to search for information on one or more particular topics or concepts.

User input defining a search query may be received in any of a variety of ways and in any of a variety of formats. For example, in some embodiments, the user input may be received as text and may be received via an input device (e.g., a keyboard, touch screen, mouse, and/or any other input device) integrated into or coupled to the client device. In some embodiments, user input may be received as audio via a microphone that is integrated into or coupled to the client device. For example, a user may speak a search query into the microphone and the application program may receive the user's voice input as audio data. In some embodiments, the client device may provide a number of different options from which the user may select to provide a search query. For example, in some embodiments, the client device may permit the user to input the query either in voice format (e.g., by speaking the query into a microphone) or in text format (e.g., by typing the query on a keyboard or a touchscreen).

In the example process 200, a representation of the user-specified query received in act 201 is transmitted to external computer 275 in act 203, and received by the external computer in act 205. In embodiments wherein the query received in act 201 is specified via voice input, automated speech recognition may be performed on audio data representing the voice input to obtain a recognition result (e.g., in textual form) that may be used to identify one or more search engines making available the type(s) of information the user seeks, and to generate queries to be submitted to those search engines. However, not all embodiments of the invention are limited to performing automated speech recognition. For example, one or more of the search engines to be queried may have a speech interface, so that audio data may be provided to such search engines instead of providing a text search query based on automated speech recognition of the audio. Embodiments of the invention are not limited to any particular implementation.

If performed, automated speech recognition may be conducted by client device 250, external computer 275, or a combination thereof. Automated speech recognition techniques are known, and any suitable automated speech recognition technique may be used to obtain a recognition result for the audio data.

Figure 4:
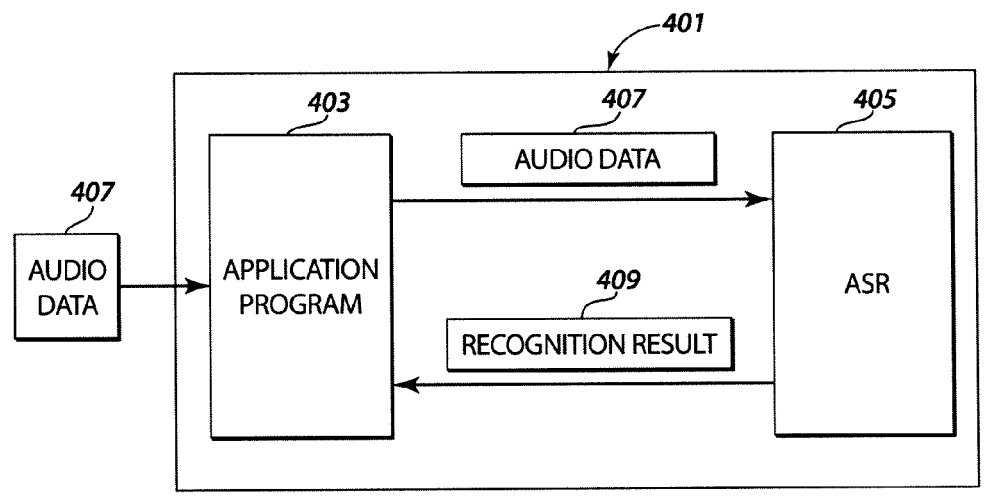
FIG. 4 is a block diagram of a client device that executes an application program for querying multiple search engines and an automated speech recognizer for performing speech recognition on voice search queries, in accordance with some embodiments.

As shown in FIG. 4, in some embodiments, the client device may execute an automated speech recognizer, which is a software program that performs automated speech recognition on audio data, and the application program may use the automated speech recognizer to obtain a recognition result of the audio data. In FIG. 4, client device 401 executes the application program 403 that performs at least some of the above-described acts of process 200 (e.g., those performed by the client device) and an automated speech recognizer 405. When application program 403 receives user-supplied audio data 407, it may pass the audio data to automated speech recognizer 405. Automated speech recognizer 405 may perform automated speech recognition on the audio data to obtain a recognition result 409 and may return recognition result 409 to application program 403 for use in formatting queries for the speech engines.

The inventors have recognized that some client devices may not have sufficient computing resources to execute an automated speech recognizer that operates with a desired level of accuracy and/or efficiency. That is, for example, a client device may not have sufficient memory to store acoustic models, language models, grammars, and/or other components of such a speech recognizer and/or may not have a processor powerful enough to perform automated speech recognition at a desired level of efficiency. This may occur in any number of situations, such as when the client device is a handheld device, such as a PDA or mobile phone.

Figure 5:
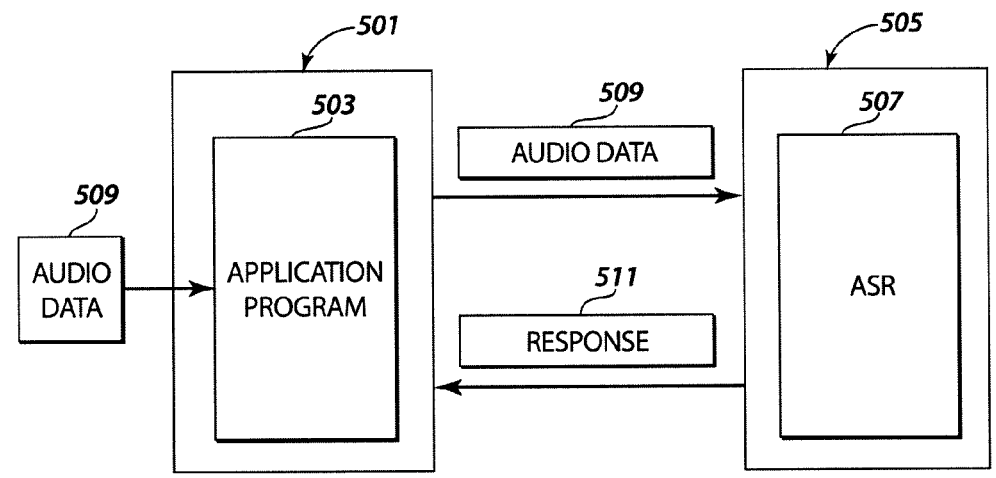
FIG. 5 is a block diagram of a client device that executes an application program for querying multiple search engines and a server that executes an automated speech recognizer and provides speech recognition services for the client device to perform speech recognition on voice search queries, in accordance with some embodiments.

Thus, in some embodiments, automated speech recognition on audio data that originates from a user may be performed by the external computer. As shown in FIG. 5, client device 501 executes application program 503 that receives voice input supplied by a user in the form of audio data. Automated speech recognition may be performed on a representation of the audio data by an automated speech recognizer 507 executing on a server 505. That is, automated speech recognition may be performed on the full audio data, or some processed representation of it. Thus, as shown in FIG. 5, in some embodiments, application program may send the user-supplied audio data 509 to automated speech recognizer 507 executing on server 505. The audio data 509 may be sent to the automated speech recognizer in any of a variety of possible ways, and may be processed on the client device and/or on the server before being passed to the speech recognizer. For example, in some embodiments, the user-supplied audio may be captured by a microphone and analog-to-digital conversion may be performed (on the client or server) on the captured microphone audio to generate digital audio data. This digital audio data may be supplied to automated speech recognizer 507. In some embodiments, some processing of the digital audio data may be performed on the client and/or server prior to sending this data to the automated speech recognizer. For example, the digital data may be compressed or some pre-processing may be performed extract parameters of the audio that are useful in automated speech recognition. The extracted parameters may be passed to automated speech recognizer 507 as the representation of the audio data or may be sent along with other audio data. In embodiments that use compression, any of a variety of possible compression algorithms may be used. For example, in some embodiments, the Speex™ codec may be used.

Thus, it should be appreciated that, as used herein, the term "audio data" may refer to an analog audio signal, a digital representation of an analog audio signal, a compressed representation of such a digital or analog signal, a set of features or parameters extracted from the digital or analog signal, any combination of the foregoing, and/or other information.

Automated speech recognizer 507 may perform automated speech recognition on audio data 509 and return to application program 503 a response 511 that comprises results from audio data 509. The results may take any suitable form. As one non-limiting example, the results may comprise a text recognition result obtained by automated speech recognizer 507 from performing automated speech recognition on the audio data.

In the example of FIG. 5, client device 501 is depicted as communicating directly with server 505. It should be appreciated that this depiction is provided merely to facilitate an understanding of the types of information sent between client device 501 and server 505, and that client device 501 may communicate with server 505 in any of a variety of ways and via any suitable communication medium, including, for example, via the Internet.

In the example of FIG. 4, automatic speech recognition on audio data received at a client device is performed on the client device, and in the example of FIG. 5, audio data is provided from the client device to a server and the server performs automatic speech recognition. However, in some embodiments, automatic speech recognition may be performed partially by the client device and partially by the server. For example, a portion of an ASR process may be performed on the client and a portion may be performed on the server. This may be done, for example, to enable the client device to perform a portion of the speech recognition process, but leave computationally intensive portions for the server.

Figure 6:
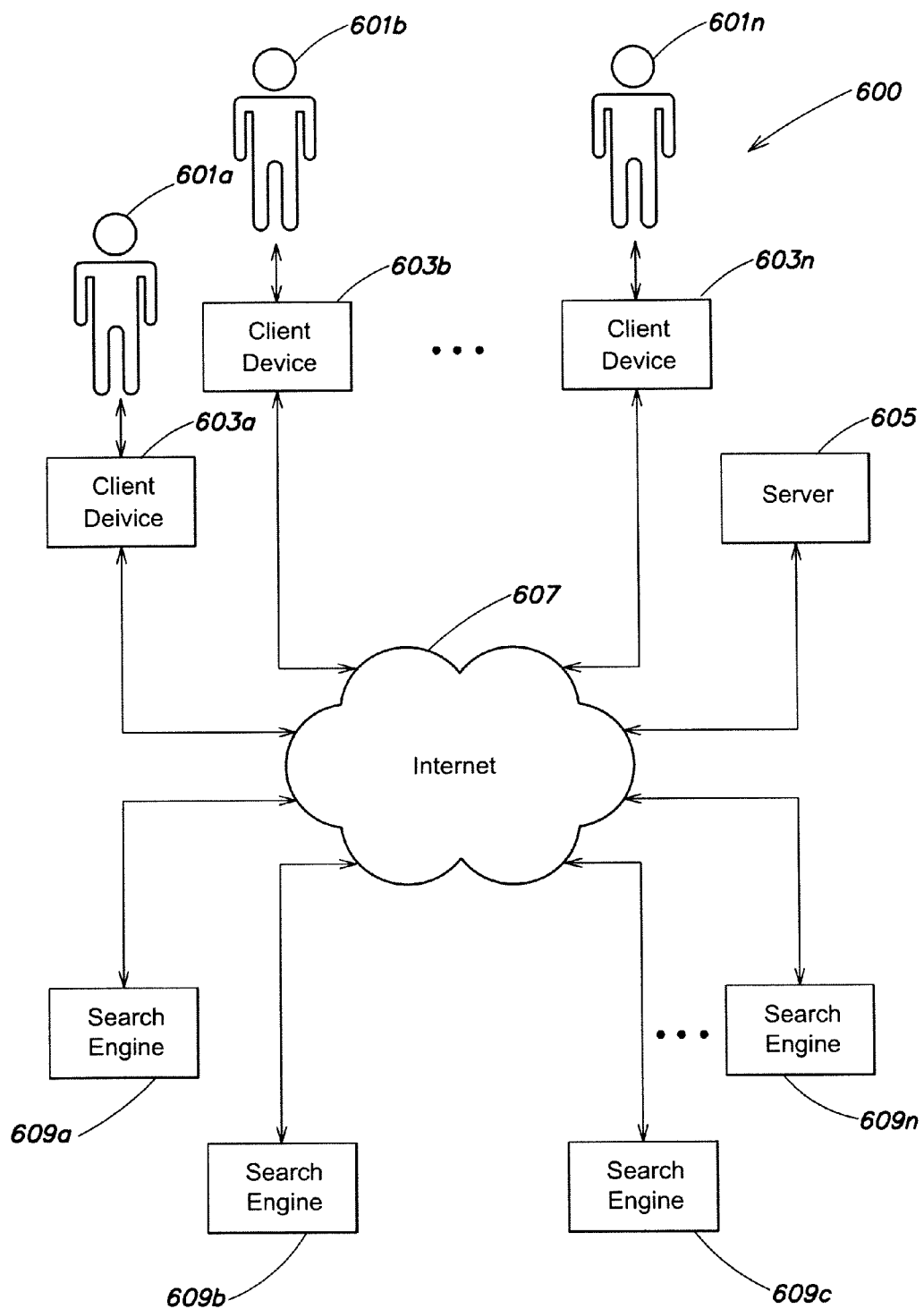
FIG. 6 is a block diagram of a computing environment in which some embodiments may be implemented.

In some embodiments, one or more servers (like server 505) may provide automated speech recognition services for multiple client devices. FIG. 6 shows a computing environment in which each of a plurality of users 601*a*, 601*b*, . . . 601*n* operates a client device 603*a*, 603*b*, . . . , 603*n*. Each client device 603 may execute an application program that sends search queries via communication medium 607 to search engines 609*a*, 609*b*, 609*c*, . . . , 609*n*, and displays the results of these search queries to its respective users (e.g., by executing some of the acts of process 200 of FIG. 2). Communication medium 607 may comprise any suitable communications infrastructure, employing any suitable communication protocol(s), including wired and/or wireless communications protocols. For example, communication medium 607 may comprise one or more intranets, local area networks (LANs), wide area network (WANs), the Internet, or any combination thereof.

Server 605 may provide automated speech recognition services to support these searches when the user enters a query audibly. Thus, in embodiments in which client devices 603 receive user-supplied search queries in the form of audio data, the client devices 603 may send some or all of the audio data via communication medium 607 to server 605 to have automated speech recognition performed on the audio data, and may receive a recognition result and/or other information (e.g., search queries and an identification of search engines to issue them to) via communication medium 607 based on the recognition result in response.

In some alternate embodiments, server 605 may provide other functionality (either instead of or in addition to ASR services) to facilitate issuance of search queries from a client device 603 to one or more of search engines 609. Some examples of this additional functionality are described in detail below. For the sake of simplicity, in the example of FIG. 6, only one server 605 is depicted. However, it should be understood that, as is conventional for Internet servers that receive a high volume of traffic, any number of servers may be used to provide the functionality of server 605 that is described herein and the traffic load from client devices 603 may be balanced across these servers using any of a variety of load balancing techniques. In addition, the functionality of the servers may be distributed in any suitable way, so that each server need not perform the same functions and may be arranged to share the functions performed by the set of servers collectively.

In embodiments in which a user supplies a search query by voice (i.e., in the form of audio data), a number of techniques may be used to facilitate automated speech recognition of the audio data to generate search queries. These techniques may be employed in embodiments in which automated speech recognition is performed entirely on the client device, in embodiments in which automated speech recognition is performed entirely on a computer external to the client device, and in embodiments wherein ASR is distributed between the client device and an external computer.

Figure 7:
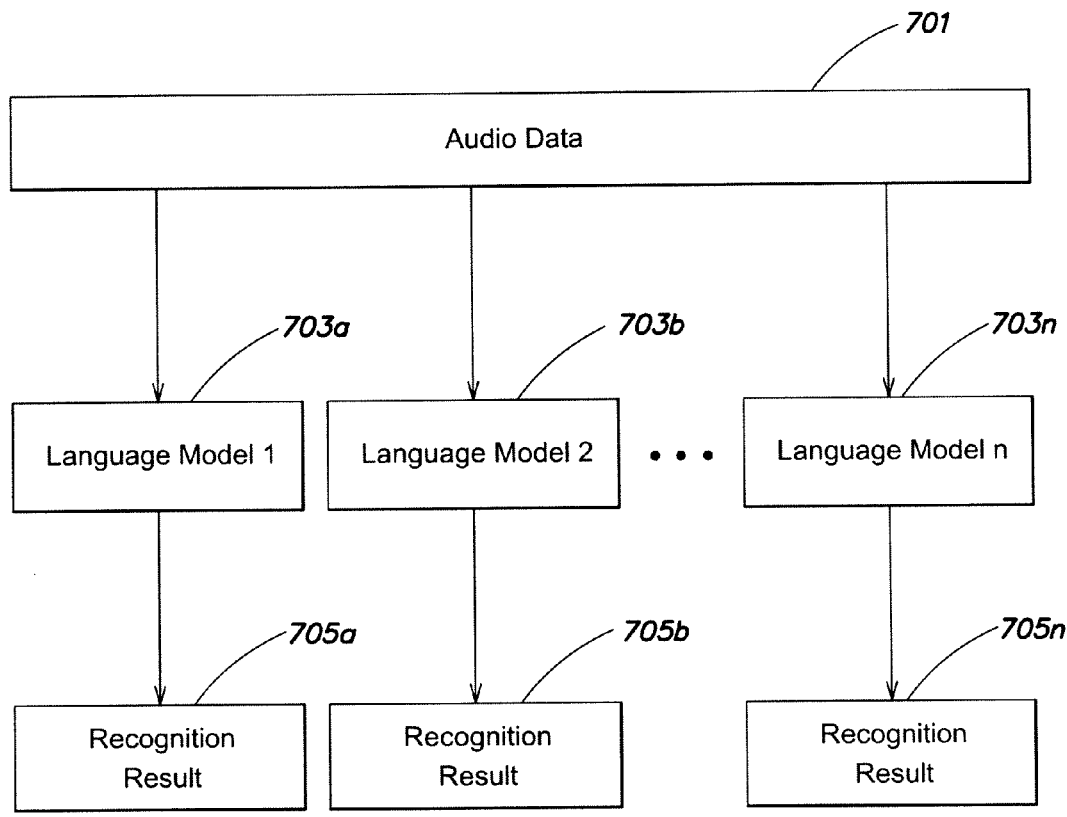
FIG. 7 is a block diagram in which audio data of a voice speech query is recognized using multiple different language models, in accordance with some embodiments.

In some embodiments, one or more language models used by the automated speech recognizer in performing speech recognition on the audio data of the user-supplied search query may be selected based on the search engine(s) which are to be queried. For example, as shown in FIG. 7, in some embodiments, the automated speech recognizer may perform recognition on the same audio data using multiple different language models to yield multiple different recognition results. In FIG. 7, speech recognition is performed on audio data 701 using language models 703*a*, 703*b*, . . . , 703*n* to generate recognition results 705*a*, 705*b*, . . . , 705*n*. Depending on the content of audio data 701 and the differences between language models 703, each of recognition results 705 may be the same, each may be different from the others, or some may be the same and some may be different. One or more of language models 703 may be associated with a particular search engine and the recognition result generated using a language model that is associated with a particular search engine may serve as the basis for the search query that is issued to that search engine.

Thus, for example, in some embodiments, a language model that has been trained on the content that is indexed by a particular search engine may be used to generate the recognition result that serves as the basis for the query that is issued to that search engine. This results in a query that is more likely to yield relevant search results for that search engine.

This technique may be particularly useful when issuing queries to site-specific search engines that index a limited amount of content that is generally directed to a particular subject area. For example, an online shoe retailer may have a site-specific search engine for its e-commerce web site. As such, the content of this web site may include shoe-specific terminology and phrases, such as the name of shoe brands and models, descriptions of shoe properties, and various other shoe-specific information. By training the language model used by a speech recognizer on the content of this web site, the recognizer is more likely to accurately recognize speech that includes the shoe-specific terminology and phrases.

Thus, for example, if a user-supplied search query in the form of audio input is received and is to be issued to both a site-specific search engine and a general-purpose search engine, the audio input may be recognized using a first language model (e.g., a language model that has been trained on content related to the content indexed by the site-specific search engine) to generate a recognition result that serves as the basis for the query to be issued to the site-specific search engine and may also be recognized using a second language model (e.g., that has been trained on more general content), different from the first language model, to generate a recognition result that serves as the basis for the query to be issued to the general-purpose search engine.

In the example described above, the recognition result that is obtained by performing speech recognition using a language model that is associated with a particular search engine serves as the basis for the search query that is issued to that search engine. However, in some embodiments, rather than issuing recognition results obtained using different language models to different search engines, multiple recognition results may be obtained using different language models and the recognition result with the highest score or confidence value may serve as the basis of a search query that is issued to multiple search engines. For example, in FIG. 7, each of recognition results 705 may be generated by performing automatic speech recognition on audio data 701 using a corresponding language model. In some embodiments, one of recognition results 705 may be selected to be the result that serves as the basis for generating a search query to be issued to multiple search engines. This selection may be made in any suitable way. For example, as discussed above, the recognition result that has the highest score or confidence value as a result of the speech recognition may be selected, or any other suitable criterion or combination of criteria may be used.

In situations in which speech recognition is performed on the same audio data using multiple language models, performing multiple separate and independent speech recognition processes with each of the different language models may increase the latency in obtaining recognition results and/or may increase the amount of processing resources used in performing speech recognition.

Thus, in some embodiments, rather than performing an entire independent speech recognition process on the audio data for each language model, one generalized language model may be used to create a lattice of hypothesized word sequences, and this lattice may be re-scored using one or more selected language models to yield recognition result(s) particularly for the selected language model(s). In this way, the time and processing resources consumed in generating the recognition results may be reduced because the same lattice is used in producing each recognition result and thus only needs to be generated once.

In the example of FIG. 7, audio data 701 is shown as being provided directly to each of language models 703. This depiction is provided merely to facilitate an understanding of how multiple language models may be used, and it should be understood that, in practice, the language models may not operate directly on audio data. For example, a lattice with multiple hypothesized sequences of words may be obtained from audio data using an acoustic model and a general language model, and specialized language models 703 may be used to rescore the general lattice and obtain a sequence of words appropriate to a specific search engine.

In some embodiments, rather than using multiple different language models in generating search queries to be provided to search engines, one language model may be selected from a plurality of available language models. For example, in some embodiments, one language model may be identified as being well-suited for recognizing a particular voice query, and that language model may be used in recognizing the query.

Any of a variety of possible criteria or combinations of criteria may be used to select a language model to be used in recognizing a particular voice query. For example, in some embodiments, the content of the query may be used as a basis for selecting a language model to be used. For example, a two-pass process may be used whereby in a first pass automatic speech recognition of a voice query or a portion of a voice query is performed using a general language model that doesn't have a specialized vocabulary. Such a language model may recognize some of the words in the query, but may not accurately recognize all of the words. The recognition result obtained from the first-pass may be used to classify the query based on topic or category. Any suitable classification technique may be used, and a variety are known.

Based on the classification, a language model that has a specialized vocabulary directed to the identified topic or category may be selected. After selection of the language model, a second-pass of automatic speech recognition may be performed using the selected language model. For example, if after the first-pass it is determined that the voice query includes word such as "directions," "street," or "road," it may be determined that voice query is map-related query, and a map-related language model (e.g., a language model that includes city, street, and place names for the United States and/or other countries) may be selected and used in the second-pass.

As discussed in greater detail below, the recognition result from the second-pass may serve as the basis for one or more search queries to be provided to one or more search engines. In addition, as discussed in more detail below, the search engine or engines that are queried may be selected based on the language model that was selected to recognize the query in the second-pass, and/or based on the content of the recognition result obtained from the second-pass.

In some embodiments, a language model that is used to recognize a voice search query supplied from a user as audio data may be updated based on topics of interest. This may be done in any of a variety of possible ways. Current events frequently result in search engines receiving a large number of search queries that include keywords associated with a particular event, including keywords that may have been previously unused and not the subject of frequent searches. For example, if a popular new movie is playing in movie theaters, search engines may receive a large number of search queries from different users that include the name of the movie, the names of the actors in the movie, or other keywords associated with the movie. Similarly, if a popular or high-profile sporting event is upcoming, search engines may receive a large number of queries that include the names of the teams and/or athletes participating in the event, or an event in popular culture may thrust a person previously unknown to the general public into the limelight (e.g., a person winning the lottery, a person accused of a high-profile crime, a person involved in a high profile scandal, etc.)

In some embodiments, words and/or phrases associated with topics of recent user interest may be identified, and the language model may be updated to improve the accuracy of recognizing these words and/or phrases. These words and/or phrases may be identified in any of a variety of ways. For example, in some embodiments in which user-supplied queries (e.g., in audio format, text format, or some other format) are provided from a plurality of client devices to a server or set of servers, the server or set of servers may identify frequently used search terms or phrases in these search queries and the language model may be updated based on these frequently used search terms. In other embodiments, words and/or phrases associated with topics of interest may be identified manually by one or more humans tasked with identifying such words or phrases.

One or more language models may be updated in this manner with any desired degree of frequency. For example, in some embodiments, a language model may be updated at a regular interval, such as once per day, once every two days, twice per day, once per week, or any of a variety of other possible intervals. In some embodiments, a language model may be updated in response to a user action, such as an indication from the user to update the language model or in any other suitable way.

In some embodiments, words provided in user search queries, words obtained from web crawling, and/or words from other sources may be collected and used to update one or more language models. A word count indicating the number of occurrences of the words in the source data may be maintained and words whose word count exceeds a threshold value may be added to the language model(s).

In some embodiments, an auto-pronunciation (e.g., a sequence of phonemes) for each word to be added to the language model may be generated and included in the language model(s) with its corresponding word. In some embodiments, a human reviewer (e.g., a linguist) may review and, if warranted, revise the automatically generated pronunciation before it is added to the language model(s).

In some embodiments, the language model(s) used in automated speech recognition of search queries may be updated using feedback indicating which search results a user selected. This may be done in any of a variety of possible ways. For example, in some embodiments, an automated speech recognizer may generate a recognition result from audio data of a user-supplied voice search query. This recognition result may serve as the basis for one or more search queries that are provided to one or more search engines, and search results from the one or more search engines may be returned and displayed to the user in response to the query or queries. The user may select one or more of the search results to view a particular web page or piece of content. In some embodiments, information about which search result(s) the user selected may be used to update the language model(s) used by the automated speech recognizer. For example, a user may speak the search query "Willie Mays" and the automated speech recognizer may incorrectly recognize the speech as "Willy Maze." As such, a search query for the phrase "Willy Maze" may be issued to one or more search engines. However, one or more of the search engines may return in its list of results a hyperlink to a web page with biographical information about Willie Mays. If the user selects this hyperlink to access that web page, the content of the web page may be used to update the language model(s). This may increase the likelihood that the next time a user speaks the phrase "Willie Mays," it will be correctly recognized.

In some embodiments, the language model(s) used for a particular user may be customized to that user's speech, using previous utterances obtained from that user. This may be done in any of a variety of ways. For example, in some embodiments, voice data received from a particular speaker may be represented as a bag-of-word feature vector, with the goal of discovering a set of representative latent speakers to "explain" the data. The outcome is that, for example, similar speakers are clustered together in a probabilistic fashion. These clusters may be used to build a set of latent speaker language model components. Using these latent components, adaptation for a particular user is performed via estimating the speaker-specific linear interpolation weights of the language model components using the received voice data from the particular speaker for which adaptation is being performed.

In some embodiments, the language model(s) used for a particular user may be updated based on the user's historical browsing information. This may be accomplished in any of a variety of ways. For example, based on the user's browsing history, web sites that are frequently visited may be identified. The language model(s) used to recognize speech queries may be re-trained using a training corpus in which content from the frequently visited web sites is emphasized.

Any or all of the above-described techniques for selecting a language model to facilitate automated speech recognition can be used in combination with each other. In addition, it should be appreciated that these techniques for selecting a language model need not be used, and in some embodiments the same language model may be used to process all voice input.

II. Determining the Type of Information and/or Action the User Seeks

Figure 12:
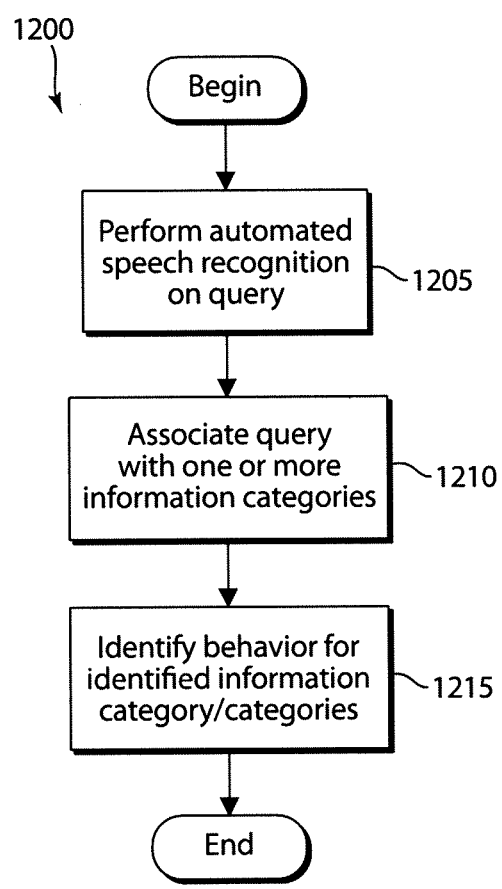
FIG. 12 is a flow chart of an illustrative process for identifying the type of information and/or action a user seeks.

In act 207 of example process 200, external computer 275 identifies the type(s) of information that the user seeks and/or action(s) that the user wishes to perform. This may be performed in any of numerous ways. An example process 1200 for determining, upon receiving a user-specified query, the type(s) of information that the user seeks and/or the actions(s) that the user wishes to perform is depicted in FIG. 12. The example process 1200 is but one technique which may be used to determine one or more types of information sought by the user and/or actions the user wishes to perform. Numerous other techniques for doing so are possible.

At the start of process 1200, automated speech recognition is performed on audio data defining the query in act 1205. As noted above, automated speech recognition may be performed in any of numerous ways, as embodiments of the invention are not limited to employing any particular technique(s). In some embodiments, the output of act 1205 is a textual representation of the user-specified query, comprising one or more words.

At the completion of act 1205, example process 1200 proceeds to act 1210, wherein the query is associated with one or more information categories. This may be accomplished in any of numerous ways. For example, a query may be associated with an information category based at least in part on the query's content.

For example, in some embodiments, the textual output generated in act 1205 may be processed to determine a semantic meaning for individual words and/or combinations of words in the user-specified query, and/or of the overall meaning of the query, to attempt to identify the type of information that the user seeks. For example, if a user-specified query includes the words "Starbucks® in Boston," then act 1210 may include determining that the word "Starbucks®" represents a restaurant, and that the word "Boston" represents a location. This may be accomplished in any of numerous ways. For example, any suitable natural language processing technique (of which numerous examples exist) may be employed to determine the semantic meaning of individual words, and/or combinations of words, in a user-specified query. The natural language processing may, for example, include applying, to individual words and/or combinations of words in a user-specified query, semantic tags that indicate a meaning for one or more of the words. The semantic tags may relate to any of numerous types of information. For example, a semantic tag may relate to software applications, books, movies, sports, businesses, music, television, and/or other information types. The embodiments of the invention that employ semantic tags are not limited to employing these or any other particular types of tags. Of course, embodiments of the invention are not limited to employing any particular natural language processing technique or applying semantic tags, as any suitable technique, whether now known or later developed, may be employed.

In some embodiments, the determination of one or more information categories to which a query relates and the behavior to be initiated in response is based (at least in part) on the semantic tags applied to the query. For example, a collection of possible information categories and associated behaviors may be defined, and a query may be associated with one or more of the information categories based on semantic tags that are applied to the query. Using the example "Starbucks® in Boston" query to illustrate, the collection of possible information categories may include a "restaurant" information category and a "location" information category, and queries to which the "restaurants" and "location" semantic tags are applied may be associated with these information categories. One or more behaviors can be associated with this combination of information categories, as discussed below. Of course, associating a query with one or more information categories need not be performed using a predefined collection of information categories and semantic tags. For example, information categories and/or semantic tags may be dynamically defined, using any suitable technique(s). Embodiments of the invention are not limited to any particular manner of implementation.

A user-specified query may be associated with multiple information categories that have different meanings. In this respect, the inventors have recognized that while a user submitting a query may intend one meaning for the content of the query, other meanings may also be possible. For example, a user submitting the query "Fargo" may intend to look for information relating to the city in North Dakota, but other semantic meanings are also possible (e.g., the user may seek information on the film). Thus, some embodiments of the invention enable a user-specified query to be associated with multiple information categories. For example, the word "Fargo" in the user-specified query may cause the query be associated with one information category relating to geographic locations and another relating to movies. Thus, in accordance with some embodiments of the invention, if it is determined, based on the content of a received query, that the content may have at least a first semantic meaning or a second semantic meaning that is different than the first semantic meaning, then a plurality of search engines to which to submit a representation of the query may be identified. The plurality of search engines may comprise a first search engine identified based on the first semantic meaning of the content and a second search engine identified based on the second semantic meaning of the content. A user-specified query may be associated with any suitable number of information categories, as embodiments of the invention are not limited in this respect.

In some embodiments, a user-specified query may be associated with an information category using information other than the content of the query. For example, the user's location, search history, browsing history, and/or other information may influence the association of a query with one or more information categories, and/or the prioritization of behaviors or actions taken if the query is associated with multiple categories. Using the example query "Fargo" above to illustrate, if the user's search and/or browsing history reveals that the user has a strong affinity for films, then this information may cause the query "Fargo" to be associated with the "movies" information category and not the "geographic locations" information category, or if associated with both, may treat the "movies" association as being more likely and therefore as a higher priority than the "geographic location" association in determining one or more actions to take, as discussed below. Conversely, if location data indicates that the user is in North Dakota when the query is submitted, then this information may cause the query "Fargo" to be associated with the "geographic locations" information category and not the "movies" information category, or if associated with both, may treat the "geographic locations" association as a higher priority. Any of numerous types of information may be considered when associating a user-specified query with an information category, as embodiments of the invention are not limited in this respect.

At the completion of act 1210, example process 1200 proceeds to act 1215, wherein a "behavior" for the identified one or more information categories is determined. In some embodiments, act 1215 may include identifying one or more search engines and/or other facilities making available information relevant to the one or more information categories identified in act 1210.

It should be appreciated that embodiments of the invention are not limited to submitting user-specified queries to search engines provided by websites. A behavior defined for an information category may comprise initiating and/or performing any of numerous types of actions, which may or may not include identifying one or more search engines to which a representation of the user-specified query should be submitted. For example, a behavior defined for an information category may include performing one or more native actions. In this respect, the inventors have recognized that some user-specified queries may reveal a desire on the user's part to perform an action, in addition to or rather than to search for information. As discussed in greater detail below, initiating a native action may include (as examples) launching an application, such as a media player application, map application, etc., a service (e.g., one which initiates a telephone call from a client device), and/or any other natively executed facility. Some embodiments of the invention define a behavior for a user-specified query which includes initiating one or more native actions.

Identifying a behavior to be initiated in act 1215 may be performed in any of numerous ways. In some embodiments, a defined mapping associates information categories with sets of behaviors, each set comprising one or more native actions and/or one or more search engines to which a corresponding user-specified query should be submitted. The mapping may also define a prioritization among the behaviors. As discussed above, prioritization can be based on any suitable criteria (e.g., relevance, compensation provided by the search engine, etc.). A set of behaviors may include any suitable number of native actions and/or search engines (e.g., a set need not comprise a plurality of native actions or search engines), as embodiments of the invention are not limited in this respect.

For example, a defined mapping may specify that user-specified queries associated with a "restaurant" and "location" information categories cause a set of behaviors to be initiated which includes launching one or more native actions and submitting the query to one or more search engines previously determined to be appropriate recipients for queries of the identified type. As a result, act 1215 may involve identifying one or more native actions to initiate and/or one or more search engines to which to submit the example user-specified query "Starbucks® in Boston" associated with the restaurant location information category in act 1210.

Table 1 below provides an illustrative mapping of various information categories to behaviors. Referring to the "Starbucks® in Boston" example to illustrate, Table 1 defines a mapping of user-specified queries associated with the "restaurant" and "location" information categories to a set of behaviors which includes launching a map application ("Maps," shown in the "Tab 1 (Prime)" column of Table 1), submitting a representation of the query to a search engine offered by a website providing restaurant reviews ("Yelp," shown in the "Tab 2" column), submitting a representation of the query to a general-purpose search engine so that telephone numbers included in search results may be identified and presented ("Call Tab," shown in the "Tab 3" column), submitting a representation of the query to a search engine offered by a website providing reference information ("Wikipedia," shown in the "Tab 4" column), submitting a representation of the query to a search engine provided by a social networking website ("Twitter," shown in the "Tab 5" column), and submitting a representation of the query to a general-purpose search engine that is identified by the user ("Gen. Search 1," shown in the "Tab 6" column). Of course, Table 1 is a non-limiting example and is merely intended as an illustration of the types of behaviors that may be mapped to information categories. Embodiments of the invention are not limited to employing the mapping shown in Table 1, or indeed any mapping at all.

TABLE 1

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Application Search | App | buy | buy angry birds | | Appl-Name-Buy | N/A | Gen. Search 1 | YouTube | Media Con. | Wikipedia | Images | N/A |
| Application Search | App | download | download the free wi fi app for ipad | | Appl-Name-Download | N/A | Gen. Search 1 | YouTube | Media Con. | Wikipedia | Images | N/A |
| Application Search | App | N/A | free wi fi app | | Appl-Name-NA | N/A | Gen. Search 1 | YouTube | Media Con. | Wikipedia | Images | N/A |
| Application Search | iOS App | N/A | alarm clock for ipod | | Appl-Product-NA | N/A | Gen. Search 1 | MacWorld.com (app reviews) | Media Con. | Wikipedia | YouTube | Images |
| Application Search | iOS App | N/A | iphone app review | | Appl-Product-Review | N/A | Gen. Search 1 | MacWorld.com (app reviews) | Media Con. | Wikipedia | YouTube | Images |
| Books | Author | Buy (download) | buy charles dickens | | Books-Author-Buy | N/A | Twitter | Amazon | Media Con. | Local Retail | Wikipedia | Gen. Search 1 |
| Books | Author | N/A | charles dickens | | Books-Author-NA | N/A | Twitter | Amazon | Images | Wikipedia | Amazon | Gen. Search 1 |
| Books | Author | Photos/Images | charles dickens images | | Books-Author-Photos | N/A | Twitter | Media Con. | Media Con. | Local Retail | Wikipedia | Gen. Search 1 |
| Books | Author | Play (locally) | read charles dickens | | Books-Author-Play | N/A | Twitter | Amazon | Media Con. | Local Retail | Wikipedia | Gen. Search 1 |
| Books | Title | Buy (download) | buy the girl with the dragon tattoo | | Books-Title-Buy | N/A | Twitter | Amazon | Media Con. | Local Retail | Wikipedia | Gen. Search 1 |
| Books | Title | N/A | the girl with the dragon tattoo | | Books-Title-NA | N/A | Twitter | Amazon | Media Con. | Local Retail | Wikipedia | Gen. Search 1 |
| Books | Title | Play (locally) | read the girl with the dragon tattoo | | Books-Title-Play | N/A | Twitter | Amazon | Media Con. | Local Retail | Wikipedia | Gen. Search 1 |
| Books | Title | Reviews | reviews of the girl with the dragon tattoo | | Books-Title-Review | N/A | Twitter | Amazon | NYTimes.com | Media Con. | Local Retail | Gen. Search 1 |
| Business Search | Other | Call | call nuance | direct call (if no dis-ambiguation) | Business-Other-Call | N/A | Twitter | Maps | Call (launch app) | Yelp | Wikipedia | Gen. Search 1 |
| Business Search | Other | Directions | directions to Target | Maps App | Business-Other-Directions | N/A | Twitter | Call Tab | Yelp | Maps | Wikipedia | Gen. Search 1 |
| Business Search | Other | Location | target in boston | | Business-Other-Location | N/A | Twitter | Call Tab | Yelp | Maps | Wikipedia | Gen. Search 1 |
| Business Search | Other | N/A | Target | | Business-Other-Info | N/A | Twitter | Call Tab | Maps | Yelp | Wikipedia | Gen. Search 1 |
| Business Search | Other | Near Me | target near me | | Business-Other-NearMe | N/A | Twitter | Maps | Images | Yelp | Wikipedia | Gen. Search 1 |
| Business Search | Other | Photos/Images | photos of target | | Business-Other-Photos | N/A | Twitter | Call Tab | Yelp | Maps | Call Tab | Gen. Search 1 |
| Business Search | Other | Reviews | review bestbuy | | Business-Other-Review | N/A | Twitter | Twitter | Call (launch app) | Yelp | Wikipedia | Gen. Search 1 |
| Business Search | Restaurants | Call | call starbucks | direct call (if no dis-ambiguation) | Business-Restaurant-Call | N/A | Wikipedia | Twitter | Call (launch app) | Yelp | Maps | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Business Search | Restaurants | Directions | directions to starbucks | Maps App | Business-Restaurant-Directions | N/A | Twitter | Call Tab | Yelp | Maps | Wikipedia | Gen. Search 1 |
| Business Search | Restaurants | Locations | starbucks in boston | | Business-Restaurant-Location | N/A | Twitter | Call Tab | Maps | Yelp | Wikipedia | Gen. Search 1 |
| Business Search | Restaurants | N/A | starbucks | | Business-Restaurant-Info | N/A | Twitter | Call Tab | Yelp | Maps | Wikipedia | Gen. Search 1 |
| Business Search | Restaurants | Near Me | starbucks near me | | Business-Restaurant-NearMe | N/A | Twitter | Call Tab | Maps | Yelp | Wikipedia | Gen. Search 1 |
| Business Search | Restaurants | Photos/Images | photos of starbucks | | Business-Restaurant-Photos | N/A | Twitter | Call Tab | Images | Yelp | Maps | Gen. Search 1 |
| Business Search | Restaurants | Reservations | starbucks reservations | | Business-Restaurant-Reservation | N/A | Twitter | Call Tab | Yelp | Maps | Wikipedia | Gen. Search 1 |
| Business Search | Restaurants | Reviews | review starbucks | | Business-Restaurant-Review | N/A | Twitter | Call Tab | Yelp | Maps | Wikipedia | Gen. Search 1 |
| Events | N/A | N/A | local events | | EventSearch-NA-NA | N/A | Twitter | Zvents.com | Eventful | LiveNation | Stubhub | Gen. Search 1 |
| General Web Search | N/A | N/A | how many organs are in the human body? | | Default | N/A | YouTube | Twitter | Gen. Search 1 | Wikipedia | Media Con. | Images |
| Maps | N/A | Directions | directions from boston to burlington | Maps App | MapSearch-NA-Directions | N/A | N/A | Images | Maps | Gen. Search 1 | Wikipedia | N/A |
| Maps | N/A | Locations | map of florida | | MapSearch-NA-Location | N/A | N/A | Images | Maps | Gen. Search 1 | Wikipedia | N/A |
| Maps | N/A | N/A | maps | | MapSearch-NA-NA | N/A | N/A | Images | Maps | Gen. Search 1 | Wikipedia | N/A |
| Movies | Actor/Director | Buy (theater) | robert de niro tickets | | Movies-ActorDirector-Tickets | N/A | Amazon | IMDB | fandango | Media Con. | Wikipedia | Gen. Search 1 |
| Movies | Actor/Director | N/A | Tom Hanks | | Movies-ActorDirector-Info | N/A | Images | Wikipedia | IMDB | Media Con. | Twitter | Gen. Search 1 |
| Movies | Actor/Director | Photos/Images | tom hanks images | | Movies-ActorDirector-Photos | N/A | fandango | IMDB | Images | Wikipedia | Media Con. | Gen. Search 1 |
| Movies | Actor/Director | Play (locally) | play brad pitt movies | | Movies-ActorDirector-Play | N/A | Twitter | IMDB | Media Con. | Wikipedia | Images | Gen. Search 1 |
| Movies | N/A | Info | movie information | | Movies-NA-Info | N/A | Media Con. | Twitter | IMDB | fandango | rottentomatoes | Gen. Search 1 |
| Movies | N/A | Review | movie reviews | | Movies-NA-Review | N/A | fandango | Twitter | rottentomatoes | IMDB | Media Con. | Gen. Search 1 |
| Movies | N/A | Schedule | movie schedules | | Movies-NA-Schedule | N/A | Media Con. | Twitter | fandango | IMDB | rottentomatoes | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Movies | Title | Play (locally) | Play avatar | Play media | Movies-Title-Play | N/A | rottentomatoes | Twitter | Media Con. | IMDB | Wikipedia | Gen. Search 1 |
| Movies | Title | Play (stream) | stream avatar | | Movies-Title-Stream | N/A | rottentomatoes | Twitter | Media Con. | IMDB | Wikipedia | Gen. Search 1 |
| Movies | Title | Schedule | showtimes for avatar | | Movies-Title-Schedule | N/A | rottentomatoes | Twitter | fandango | IMDB | Wikipedia | Gen. Search 1 |
| Movies | Title | Song | seabiscuit theme song | | Movies-Title-Song | N/A | rottentomatoes | Twitter | Media Con. | IMDB | Wikipedia | Gen. Search 1 |
| Movies | Title [in theaters] | Buy (theater) | tickets for inception | | Movies-Title-Tickets | N/A | Twitter | IMDB | fandango | rottentomatoes | Wikipedia | Gen. Search 1 |
| Movies | Title [in theaters] | N/A | inception | | Movies-Title-Info | N/A | Twitter | fandango | IMDB | rottentomatoes | Wikipedia | Gen. Search 1 |
| Movies | Title [in theaters] | Photos/Images | inception photos | | Movies-Title-Photos | N/A | fandango | IMDB | Images | rottentomatoes | Wikipedia | Gen. Search 1 |
| Movies | Title [in theaters] | Review | inception review | | Movies-Title-Review | N/A | Media Con. | IMDB | rottentomatoes | fandango | Wikipedia | Gen. Search 1 |
| Movies | Title [not in theaters] | Buy (download) | buy avatar | | Movies-Title-Buy | N/A | IMDB | Amazon | Media Con. | Local Retail | rottentomatoes | Gen. Search 1 |
| Movies | Title [not in theaters] | N/A | avatar | | Movies-Title-Info | N/A | Twitter | Media Con. | IMDB | rottentomatoes | Wikipedia | Gen. Search 1 |
| Movies | Title [not in theaters] | Photos/Images | avatar photos | | Movies-Title-Photos | N/A | Gen. Search 1 | IMDB | Images | rottentomatoes | Wikipedia | Gen. Search 1 |
| Movies | Title [not in theaters] | Review | avatar review | | Movies-Title-Review | N/A | Twitter | IMDB | rottentomatoes | Wikipedia | Media Con. | Gen. Search 1 |
| Music | Artist | Buy (download) | buy lady gaga music | | Music-Artist-Buy | N/A | LiveNation | Amazon | Media Con. | Local Retail | Wikipedia | Gen. Search 1 |
| Music | Artist | N/A | lady gaga | | Music-Artist-Info | N/A | LiveNation | Twitter | Media Con. | Wikipedia | Images | Gen. Search 1 |
| Music | Artist | N/A | joe lean on goodfellas | | Music-Artist-Movie | N/A | Gen. Search 1 | IMDB | Media Con. | Wikipedia | Twitter | Images |
| Music | Artist | Photos/Images | show me a photo of lady gaga | | Music-Artist-Photos | N/A | LiveNation | Twitter | Images | Media Con. | Wikipedia | Gen. Search 1 |
| Music | Artist | Play (locally) | play lady gaga | Play media in background | Music-Artist-Play | N/A | LiveNation | Twitter | Media Con. | Wikipedia | Images | Gen. Search 1 |
| Music | Artist | Radio (stream) | stream lady gaga songs | Pandora | Music-Artist-Stream | N/A | LiveNation | Twitter | Media Con. | Wikipedia | Images | Gen. Search 1 |
| Music | Artist | Tickets (buy) | lady gaga tickets | | Music-Artist-Tickets | N/A | Media Con. | Twitter | LiveNation | StubHub | Wikipedia | Gen. Search 1 |
| Music | Song/Album | Buy (download) | buy album love | | Music-Album/Song-Buy | N/A | Twitter | Amazon | Media Con. | Local Retail | Wikipedia | Gen. Search 1 |
| Music | Song/Album | N/A | macarena | | Music-Song-Info | N/A | YouTube | Twitter | Media Con. | Wikipedia | Gen. Search 1 | N/A |
| Music | Song/Album | Play (locally) | play macarena | Play media in background | Music-Album/Song-Play | N/A | N/A | Twitter | Media Con. | Wikipedia | Gen. Search 1 | N/A |
| Music | Song/Album | Radio (stream) | stream album love love love | Pandora | Music-Album/Song-Stream | N/A | N/A | Twitter | Media Con. | Wikipedia | Gen. Search 1 | N/A |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Music Videos | Artist | N/A | lady gaga videos | | Videos-Artist-Info | N/A | LiveNation | YouTube | Media Con. | Wikipedia | Twitter | Gen. Search 1 |
| Music Videos | Artist | Play (locally) | play lady gaga music videos | Play media in background VEVO | Videos-Artist-Play | N/A | LiveNation | YouTube | Media Con. | Wikipedia | Twitter | Gen. Search 1 |
| Music Videos | Artist | Play (stream) | stream lady gaga music videos | | Videos-Artist-Stream | N/A | LiveNation | YouTube | Media Con. | Wikipedia | Twitter | Gen. Search 1 |
| Music Videos | Song | Play (locally) | play the music video for macarena | Play media in background VEVO | Videos-Song-Play | N/A | Twitter | YouTube | Media Con. | Wikipedia | Gen. Search 1 | N/A |
| Music Videos | Song | Play (stream) | stream the music video for macarena | | Videos-Song-Stream | N/A | Twitter | YouTube | Media Con. | Wikipedia | Gen. Search 1 | N/A |
| News | N/A | N/A | Haiti earthquake | | News-NA-NA | N/A | YouTube Images | Twitter | CNN | NYTimes.com | Images Twitter | Gen. Search 1 YouTube |
| News | User Specified Site | N/A | USAToday | | News-SpecSite-NA | Gen. Search 1 | Images | NYTimes.com | User Specified Site | CNN | Twitter | |
| Product Search | Local Retail | N/A | call of duty | | Product-Game-Info | N/A | Twitter | Nextag | Amazon | Local Retail | IGN | Gen. Search 1 |
| Product Search | Local Retail | N/A | iphone | | Product-NA-Info | N/A | Twitter | Nextag | Amazon | Local Retail | Images | Gen. Search 1 |
| Product Search | Local Retail | N/A | iphone review | | Product-NA-Review | N/A | Twitter | Nextag | Amazon | Local Retail | Images | Gen. Search 1 |
| Product Search | Local Retail | Reviews | call of duty review | | Product-Game-Review | N/A | Twitter | Amazon | IGN | Local Retail | Nextag | Gen. Search 1 |
| Product Search | N/A | N/A | ipod near by | | Product-LocalRetail-NA | N/A | Gen. Search 1 | Amazon | Local Retail | Nextag | Twitter | Images |
| Product Search | N/A | Photos/Images | iphone photos | | Product-NA-Photos | N/A | Nextag | Amazon | Images | Local Retail | Twitter | Gen. Search 1 |
| Social Search | Facebook | N/A | marc regan on facebook | | URL-NA-NA | N/A | Gen. Search 1 | MySpace | Facebook | Twitter | Images | N/A |
| Social Search | MySpace | N/A | marc regan on myspace | | URL-NA-NA | N/A | Gen. Search 1 | Twitter | MySpace | Facebook | Images | N/A |
| Social Search | Twitter | N/A | marc regan on twitter | | URL-NA-NA | N/A | Gen. Search 1 | MySpace | Twitter | Facebook | Images | N/A |
| Sports | Athlete | Biography | michael jordan biography | | Sports-Athlete-Bio | N/A | Gen. Search 1 | Twitter | Wikipedia | ESPN | Twitter | N/A |
| Sports | Athlete | N/A | michael jordan | | Sports-Athlete-NA | N/A | Gen. Search 1 | Twitter | ESPN | Wikipedia | Images | N/A |
| Sports | Athlete | Photos/Images | photos of michael jordan | | Sports-Athlete-Photos | N/A | Gen. Search 1 | Twitter | Images | ESPN | Wikipedia | N/A |
| Sports | Athlete | Statistics | michael jordan statistics | | Sports-Athlete-Stats | N/A | Gen. Search 1 | Wikipedia | ESPN [player stats] | Wikipedia | Images | N/A |
| Sports | Sport Type | N/A | NBA | | Sports-SportType-Info | N/A | Twitter | Wikipedia | ESPN | Gen. Search 1 | Images | N/A |
| Sports | Sport Type | News | NBA news | | Sports-SportType-Info | N/A | Twitter | Wikipedia | ESPN [league news] | Gen. Search 1 | Images | N/A |
| Sports | Sport Type | Photos/Images | NHL photos | | Sports-SportType-Photos | N/A | Twitter | ESPN | Images | Wikipedia | Gen. Search 1 | N/A |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Sports | Sport Type | Schedule | NBA schedule | | Sports-SportType-Info | N/A | Twitter | Wikipedia | ESPN [league schedule] | Gen. Search 1 | Images | N/A |
| Sports | Sport Type | Scores | NBA scores | | Sports-SportType-Info | N/A | Twitter | Wikipedia | ESPN [league scores] | Gen. Search 1 | Images | N/A |
| Sports | Sport Type | Standings | NBA standings | | Sports-SportType-Info | N/A | Twitter | Wikipedia | ESPN [league standings] | Gen. Search 1 | Images | N/A |
| Sports | Sport Type | Statistics | NBA stats | | Sports-SportType-Info | N/A | Twitter | Wikipedia | ESPN [league stats] | Gen. Search 1 | Images | N/A |
| Sports | Sport Type | Tickets | football tickets | | Sports-SportType-Tickets | N/A | Twitter | ESPN | StubHub | TicketMaster | Images | N/A |
| Sports | Team | N/A | dallas cowboys | | Sports-Team-Info | N/A | Gen. Search 1 | Wikipedia | ESPN | Twitter | Images | N/A |
| Sports | Team | News | dallas cowboys news | | Sports-Team-Info | N/A | Gen. Search 1 | Wikipedia | ESPN [team news] | Twitter | Images | N/A |
| Sports | Team | Photos/Images | boston bruins photos | | Sport-SportType-Photos | N/A | Twitter | ESPN | Images | Wikipedia | Gen. Search 1 | N/A |
| Sports | Team | Schedule | dallas cowboys schedule | | Sports-Team-Info | N/A | Gen. Search 1 | Wikipedia | ESPN [team schedule] | Twitter | Images | N/A |
| Sports | Team | Scores | dallas cowboys scores | | Sports-Team-Info | N/A | Gen. Search 1 | Wikipedia | ESPN [team scores] | Twitter | Images | N/A |
| Sports | Team | Standings | dallas cowboys standings | | Sports-Team-Info | N/A | Gen. Search 1 | Wikipedia | ESPN [team standings] | Twitter | Images | N/A |
| Sports | Team | Statistics | dallas cowboys stats | | Sports-Team-Info | N/A | Gen. Search 1 | Wikipedia | ESPN [team stats] | Twitter | Images | N/A |
| Sports | Team | Tickets | Tickets for dallas cowboys games | | Sports-Team-Tickets | N/A | Twitter | ESPN [team] | StubHub | TicketMaster | Gen. Search 1 | N/A |
| Sports | Team | Tickets | find me chicago blackhawks tickets | | Sports-Team-Tickets | N/A | Twitter | ESPN [team] | StubHub | TicketMaster | Gen. Search 1 | N/A |
| Television | Actor/Director | Buy (download) | buy David Letterman shows | | Tv-Actor-Buy | N/A | IMDB | Amazon | Media Con. | Local Retail | Gen. Search 1 | N/A |
| Television | Actor/Director | Buy (store) | buy David Letterman on DVD | | Tv-Actor-Buy | N/A | IMDB | Media Con. | Amazon | Local Retail | Gen. Search 1 | N/A |
| Television | Actor/Director | N/A | David Letterman | | Tv-Actor-Info | N/A | Gen. Search 1 | IMDB | Wikipedia | Twitter | Media Con. | Images |
| Television | Actor/Director | Photos/Images | David Letterman photos | | Tv-Actor-Photos | N/A | Gen. Search 1 | Twitter | Images | Wikipedia | IMDB | Media Con. |
| Television | Actor/Director | Play (locally) | play David Letterman shows | | Tv-Actor-Play | N/A | Twitter | IMDB | Media Con. | Wikipedia | Gen. Search 1 | N/A |
| Television | Actor/Director | Play (stream) | stream David Letterman shows | | Tv-Actor-Stream | N/A | Twitter | IMDB | Media Con. | Wikipedia | Gen. Search 1 | N/A |
| Television | Title | Buy (download) | buy married with children | | Tv-Title-Buy | N/A | IMDB | Amazon | Media Con. | Local Retail | Twitter | Gen. Search 1 |
| Television | Title | Buy (store) | buy married with children on blu-ray | | Tv-Title-Buy | N/A | IMDB | Media Con. | Amazon | Local Retail | Twitter | Gen. Search 1 |
| Television | Title | N/A | married with children | | Tv-Title-Info | N/A | IMDB | Amazon | Media Con. | Local Retail | Twitter | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Television | Title | Photos/Images | married with children photos | | Tv-Title-Photos | N/A | IMDB | Media Con. | Images | Twitter | Gen. Search 1 | N/A |
| Television | Title | Play (locally) | play married with children | | Tv-Title-Play | N/A | IMDB | Amazon | Media Con. | Local Retail | Twitter | Gen. Search 1 |
| Television | Title | Play (stream) | stream married with children | | Tv-Title-Stream | N/A | IMDB | Amazon | Media Con. | Local Retail | Twitter | Gen. Search 1 |
| Television | Title | Song | punky brewster theme song | | Tv-Title-Song | N/A | N/A | IMDB | Media Con. | Amazon | Gen. Search 1 | N/A |
| User Specified Site | Content Type KNOWN | | call of duty 4 review on joystiq.com | | URL-NA-NA | N/A | Tab 4 | Tab 2 | User Specified Site | Tab 1 (prime) | Tab 3 | Tab 5 |
| User Specified Site | Content Type UNKNOWN | amazon | Phillips razor on Amazon | | URL-NA-NA | N/A | Gen. Search 1 | eBay | Amazon | Local Retail | Images | N/A |
| User Specified Site | Content Type UNKNOWN | buy | Phillips razor on Buy.com | | URL-NA-NA | N/A | Gen. Search 1 | Amazon | Buy | Local Retail | eBay | Images |
| User Specified Site | Content Type UNKNOWN | ebay | Phillips razor on Ebay | | URL-NA-NA | N/A | Tab 4 | Amazon | eBay | Local Retail | Images | N/A |
| User Specified Site | Content Type UNKNOWN | Google maps - directions | directions to walmart on Google maps | Google maps | URL-NA-NA | Tab 7 | Tab 5 | Tab 3 | Google maps | Tab 2 | Tab 4 | Tab 6 |
| User Specified Site | Content Type UNKNOWN | Google maps - other | Boston on Google maps | | URL-NA-NA | Tab 7 | Tab 5 | Tab 3 | Google maps | Tab 2 | Tab 4 | Tab 6 |
| User Specified Site | Content Type UNKNOWN | lastfm | lady gaga on lastfm | | URL-NA-NA | Tab 6/7 | Tab 4 | Tab 2 | User Specified Site | Tab 1(prime) | Tab 3 | Tab 5 |
| User Specified Site | Content Type UNKNOWN | pandora | lady gaga on pandora | Pandora | URL-NA-NA | Tab 6/7 | Tab 4 | Tab 2 | User Specified Site | Tab 1(prime) | Tab 3 | Tab 5 |
| User Specified Site | Content Type UNKNOWN | | hotel reviews on livejournal.com | | URL-NA-NA | Tab 6/7 | Tab 4 | Tab 2 | User Specified Site | Tab 1(prime) | Tab 3 | Tab 5 |
| Videos | Title | Buy | buy video my fair lady | | Videos-Title-Buy | N/A | YouTube | eBay | Media Con. | Amazon | Local Retail | Gen. Search 1 |
| Videos | Title | Stream | stream video my fair lady | | Videos-Title-Stream | N/A | eBay | YouTube | Media Con. | Amazon | Local Retail | Gen. Search 1 |
| Videos (generic) | N/A | N/A | dog tricks videos | | Videos-NA-NA | N/A | Amazon | Twitter | YouTube | Media Con. | Gen. Search 1 | N/A |
| Weather | N/A | N/A | Current weather | | Weather-NA-NA | N/A | N/A | wunderground.com | accuweather.com | weather | Gen. Search 1 | N/A |

As can be seen from Table 1, user-specified queries associated with different information categories may be mapped to different sets of behaviors. For example, a user-specified query associated with the "Title [in theaters]" and "Buy [Theater]" information categories may be submitted to a set which includes a search engine provided by a website enabling users to purchase movie tickets ("fandango," shown in the "Tab 1 (Prime)" column of Table 1), a search engine offered by a website providing movie reviews ("rottentomatoes," shown in the "Tab 2" column), a search engine offered by a website providing movie information ("IMDB," shown in the "Tab 3" column), a search engine offered by a website providing reference information ("Wikipedia," shown in the "Tab 4" column), a search engine provided by a social networking website ("Twitter," shown in the "Tab 5" column), and a general-purpose search engine identified by the user ("Gen. Search 1," shown in the "Tab 6" column). Any suitable number and type of behaviors may be mapped to a set of information categories, as embodiments of the invention are not limited in this respect.

It should be appreciated that embodiments of the invention are not limited to employing a pre-defined mapping of information categories to sets of search engines and/or native actions. Any suitable technique(s) may be employed to determine a set of behaviors appropriate for a user-specified query associated with a particular information category. For example, if a set of behaviors includes submitting a query to one or more search engines, the search engine(s) may be identified dynamically, such as based on the content of the query, and/or other information. For example, as described further below, the presence and/or accuracy of location data provided with a user-specified query may be used at least partially to determine which search engine(s) are identified in act 1215.

It should be appreciated that identifying search engines to which a user-specified query should be submitted, in accordance with some embodiments of the invention, offers the opportunity to make the particular type of information determined to be that which the user seeks available to him/her more quickly than conventional approaches may allow. Using the above example query "Starbucks® in Boston" to illustrate, a conventional approach to searching for Starbucks®' locations in Boston may entail the user submitting the same example query to a general-purpose search engine. While the results returned by the general-purpose search engine may include pages provided by similar sites to those identified in the example above (i.e., by a site providing access to map data, a site providing restaurant reviews, a site providing reference information, etc.), there is no guarantee that results from these sites will be included in the results. Further, even if the results include pages from sites similar to those identified in the example, the user may be forced to sift through other results that are unrelated to the particular information that he/she seeks. For example, a general-purpose search engine may respond to the query "Starbucks® in Boston" by generating results including links to sites providing information on other restaurants in Boston, information on the Starbucks® corporation, information on the city of Boston, etc. None of this is the information the user seeks, but the user must review (at least superficially) all of it to locate the type of information he/she ultimately seeks. In addition, if the user is interested in information from a website providing map data, the user must select that link in the saved search results restored, as these results are not directly presented. Thus, conventional approaches may require a user to expend unnecessary amounts of time and mental energy to locate information of a particular type. By contrast, embodiments of the invention may identify, upon receiving a user's query, the particular type of information that the user seeks, and attempt to immediately present information of that type to the user (e.g., based on an estimated similarity between the content of the query, and/or other information, and content made available by one or more search engines). As a result, embodiments of the invention may reduce the time and cognitive load associated with locating a particular type of information. Using the example above to illustrate, the user may be immediately presented with results from a plurality of search engines, for instance, map data showing the locations of Starbucks® restaurants in Boston, reviews of various Starbucks® locations in Boston, etc.

It should be appreciated that by identifying a plurality of search engines to which queries for information of a particular type should be submitted, embodiments of the invention can be aggressive in attempting to immediately present a specific type of information the user is believed to seek, because other less specific information can simultaneously be provided as a fallback option in case the aggressive, specific approach turns out to misapprehend the user's intent. As an example, for queries associated with a particular information category, embodiments of the invention may identify one or more "most aggressive" options (e.g., provided one or more sites making available specialized information that is closely related to a particular information category). In the example given above, these options may be the site providing access to map data and/or restaurant reviews. As described in further detail below, results generated by the most aggressive option(s) may be presented more prominently than results generated by other, less specific options. In some embodiments, the freedom to present specialized information prominently in response to a search is afforded by the other, less aggressive search engines in the identified set, which provide fallback options in case the specialized information is not the type that the user seeks. In the example above, these options are provided by the search engines provided by sites making available reference information, etc. Thus, if the primary options do not provide the type of information the user seeks, the alternatives also presented may provide more generalized information that may encompass the type of information which the user seeks. In addition, even if the most aggressive option provides the type of information that the user initially sought, these fallback options may provide access to other information related to the specific type of information which the most aggressive option provides, but which the user may not have thought to search for, or may have intended to also search for after completing an initial search.

In some embodiments, identifying a set of search engines to which a user-specified query should be submitted may involve identifying one or more search engines for each of multiple potential meanings of the content of the query. In this respect, as noted above, a user-specified query may be associated in act 1210 with more than one information category, perhaps because the content of the user's query is identified as having more than one potential meaning. If a user-specified query is associated with more than one information category in act 1210, then identifying in act 1215 a behavior (e.g., a set of search engines to which the query should be submitted) may entail any of numerous actions. For example, in some embodiments, act 1215 may include identifying which potential meaning is most likely to be the meaning intended by the user. This may be accomplished in any of numerous ways. For example, the user's location, search history, browsing history, and/or other information may be analyzed to determine a probability that the user intended each potential meaning, using any of numerous techniques. Using the "Fargo" example query given above to illustrate, if the user has recently searched for information on other films and is not currently located in North Dakota, then it may be determined that it is more probable that the user intended to search for information on the film Fargo, and less probable that the user intended to search for information on the city. As a result, the set of search engines identified as being the ones to which the query should be submitted, and/or the ones from which results should be most prominently displayed, may be the ones associated with the movies information category rather than the geographic locations information category.

As mentioned above, embodiments of the invention are not limited to determining which potential meaning is most likely and identifying only a set of search engines to which the query should be submitted on this basis, as queries can be submitted to different search engines based on alternative semantic meanings. Thus, in some embodiments, for the example query "Fargo," a set of search engines may, for example, be identified which includes a first search engine provided by a website that makes available information on films, a second search engine provided by a website that makes available information on geographic locations, a third, general-purpose search engine, etc., so that more than one potential meaning may be represented in the results generated. In alternate embodiments, if multiple potential meanings for a user-specified query are identified, only general-purpose search engines may be identified as that to which the user's query should be submitted, since more than one potential meaning may be represented in the results generated by the general-purpose search engine.

Further, if a user-specified query cannot be associated with any information categories in act 1210 (e.g., because no semantic tags are applied to the query, so that the query is not associated with an information category), then act 1215 may include identifying one or more general-purpose search engines as the search engine(s) to which the user's query should be submitted. Embodiments of the invention may process a query which cannot be associated with an information category in any suitable fashion.

In some embodiments, the number of search engines identified in act 1215 may differ depending on the information category or categories to which the query is mapped, and the number and type of search engines relevant thereto. For example, act 1215 may include, for a user-specified query mapped to the restaurant locations information category in act 1210, identifying a first quantity of search engines to which the query should be submitted. For a user-specified query mapped to the geographic locations information category in act 1210, act 1215 may include identifying a different quantity of search engines to which the query should be submitted. Queries mapped to multiple information categories, or mapped to no information categories, may have different numbers of search engines identified. Any suitable number of search engines may be identified for any user-specified query, as embodiments of the invention are not limited in this respect.

In some embodiments, a user may specify one or more of the search engines to which one or more queries may be submitted. For example, the user may specify that certain queries (e.g., all queries, those which are mapped to particular information categories, etc.) be submitted to one or more specified search engines. The user may specify such search engine(s) in any suitable manner, e.g., via direct input (e.g., to a client device via a keyboard, touch screen, and/or other input facility), and this information may be stored by the application program on client device 250 and/or external computer 275. In some embodiments, input specifying one or more search engines may be supplied when the user provides a search query to the application program. In other embodiments, the input may be supplied once by the user and stored, and each time a user-specified query is received the information may be accessed to determine whether there are previously-specified search engines to which the query is to be submitted. Embodiments of the invention may store and/or retrieve one or more specified search engines in any of numerous ways.

A user may also specify within the query one or more search engines to which the query should be submitted. For example, the user may submit the query "give me the Wikipedia page for George Washington," or "give me the Yelp review for John Doe's Bar and Grill," and embodiments of the invention may provide for the query being submitted to the identified search engine. This may be accomplished in any of numerous ways. In some embodiments, queries that include the name of a particular search engine may be mapped to a particular information category in act 1210 (e.g., based on the presence of the word identifying the search engine in the query), and a behavior may be identified for that information category that includes submitting the query to the identified search engine. In other embodiments, the name of a search engine within a user-specified query may be identified without mapping the query to an information category. Embodiments of the invention may identify a search engine to which a query is submitted using any suitable technique(s).

As noted above, in some embodiments, act 1215 need not include only determining a set of search engines to which a user-specified query should be submitted. For example, in some embodiments, a behavior that is identified in act 1215 for a user-specified query may include the initiation of one or more native actions on client device 250, either in addition to or instead of determining one or more search engines for a query. In this respect, the inventors have recognized that some user-specified queries may reveal a desire to perform an action in addition to or rather than search for information. For example, a user-specified query that includes the words "play I Got a Feeling video" may indicate a desire to play a video, rather than to search for information on the song "I Got a Feeling." As a result, some embodiments of the invention may define a behavior for a query which includes initiating that action. For example, the action may include launching a media player application on the user's device to play a song or video (as in the example above), and/or performing one or more other actions. Thus, in some embodiments, an external computer (e.g., external computer 275, shown in FIG. 2) may, upon receiving a query comprising content from a device, determine based at least in part on the content of the query that an application is to be launched on the device. The external computer may cause the device to launch the application using at least some information determined from the content of the query. In some embodiments, a client device (e.g., client device 250, shown in FIG. 2) may receive a free-form query from a user, transfer a representation of the query to at least one computer, and receive from the at least one computer at least one instruction to launch an application on the device.

In some embodiments, a behavior that is defined for a user-specified query may include both initiating a native action and also initiating a search for information to one or more search engines. For example, if a user-specified query appears to indicate a desire to initiate an action, the action may be initiated, and a query may be submitted to one or more identified search engines. This may, for example, be preferable in certain instances to merely initiating the native action, since the user may have intended to search for information rather than initiate an action, so that merely initiating the action without also initiating a search may confuse and/or frustrate the user. Example ways in which a user may switch between a native action (e.g., a natively executing application) and search results are described in detail below.

In some embodiments, a behavior defined for a user-specified query may include instructing a client device to perform one or more of a set of alternative actions. In this respect, external computer 275, which performs the act 1215 in the example process 200, may not know what applications are installed on client device 250, and thus may not know what applications are available to launch. In some embodiments, an ordered list of actions (e.g., applications) may be specified by the external computer 275 and received by the client device. When the ordered list is received, the client device may first attempt to perform the first action (e.g., launch a first application) on the list, and if the action cannot be performed (e.g., because the first application is not installed on the device), attempt to perform the second action (e.g., launch the second application) on the list, until either the client device is able to perform a specified action or the list of alternatives is exhausted. Of course, embodiments of the invention that relate to initiating a native action are not limited to such an implementation. For example, an ordered list need not be specified. Rather, in some embodiments, a native action may be specified to the client device in generic terms (e.g., "launch a media player"), and the client device may choose from the applications installed which one to launch. In other embodiments, the external computer may be informed of the applications installed on the device (e.g., via information provided with a user-specified query or in any other suitable way), so that specific instructions may be given to the application on the client device about which application(s) to launch. Embodiments of the invention that relate to initiating a native action are not limited to any particular implementation.

At the completion of act 1215, process 1200 completes.

Referring again to FIG. 2, at the completion of act 207 wherein the type of information and/or action the user seeks is identified (e.g., using any of the above-described techniques), example process 200 proceeds to act 209, wherein information is generated by external computer 275. This may be performed in any of numerous ways, and the information may take any of various forms (e.g., depending on the behavior identified in act 1215). For example, act 209 may include generating a representation of the user-specified query received in act 1205 for submission to one or more search engines identified in act 1215, generating instructions to initiate an action on the client device identified in act 1215, and/or generating any of numerous other forms of information, as embodiments of the invention are not limited in this respect.

If a behavior identified in act 1215 includes submitting a representation of the user-specified query to one or more search engines, then act 209 may include external computer 275 generating instructions specifying the search engine(s) and a query to be submitted to each. In some embodiments, a query to be submitted to a search engine may be specified in the form of a Universal Resource Locator (URL) having encoded therein a representation of the query, appropriately formatted for that search engine. For example, one or more words in a user-specified query may be encoded in a URL formatted for a search engine. If a word in a user-specified query is susceptible to multiple representations (e.g., a state name, which is commonly abbreviated), then act 209 may include modifying the word to conform to the search engine's requirements. For example, act 209 may involve modifying the word "Massachusetts" in a user-specified query to be encoded as "MA" within a URL. Any suitable types of modification or other processing may be performed, as embodiments of the invention are not limited in this respect. The modification or other processing may, in some embodiments, be performed by external computer 275. However, embodiments of the invention are not limited to such an implementation, as the modification or other processing may be performed by the client device 250, or by both client device 250 and external device 275.

FIG. 9 depicts example URLs that may be generated for three different search engines for the user-specified query "Miles Davis." Of course, embodiments of the invention are not limited to employing the format depicted for any search engine, whether or not the search engine is represented in FIG. 9.

Some search engines cannot be queried with a simple URL. For example, for some search engines, the client first establishes a connection or session with the search engine, and then sends the query to the search engine. If such a search engine is identified as a search engine to be queried, a query based on the content of the user-supplied query may be generated in a format suitable for that search engine. Like the URLs, the query for such a search engine may be generated by the application program on the client device and/or by a computer external to the client device (e.g., server 605).

If a behavior identified in act 1215 includes initiating a native action, then act 209 may include external computer 275 generating instructions specifying the actions to be initiated. As noted above, the instructions may, for example, specify a particular application to be launched (e.g., using a Uniform Resource Identifier, or URI, identifying the application and parameters identifying content which the application should process). Alternatively, the instructions may specify a plurality of applications (e.g., in an ordered list), from which the client device may select one to launch, in any suitable manner (e.g., by attempting to launch each application specified until an application installed on the device is found).

In another embodiment, the instructions may specify a desired behavior (e.g., an action to be initiated) without specifying an application to achieve it, thereby leaving it to the client to identify an installed application corresponding to the specified behavior. It should be appreciated that embodiments of the invention are not limited to generating instructions specifying that only a single behavior action should be initiated, as any suitable number of actions may be initiated. Embodiments of the invention are not limited in this respect.

Act 209 may include generating instructions specifying that both a native action is to be initiated and that a representation of the user-specified query is to be submitted to one or more search engines. These instructions may specify that these tasks be performed in any of numerous ways. For example, act 1220 may include generating instructions specifying that an application is to be launched, and that the search results should be displayed as a backup option if the corresponding application is stopped by the user after launch. Alternatively, the instructions may specify that initiation of the native action should be presented as an option which the user may select (e.g., together with an option of having search queries submitted, among search results returned by identified search engines, etc.). Any of numerous implementations are possible. As another alternative, if the client device allows multiple applications to be open simultaneously, the native application can be launched (e.g., in one window) while the search results are returned simultaneously (e.g., in another window).

In some embodiments, act 209 may include generating instructions instructing the client device to provide additional information to the external computer 275. In one example, the instructions generated in act 209 may include a request to provide more accurate location information, since the device's location may drive whether certain behaviors (e.g., submission of queries to certain search engines, and/or including certain search parameters in a query) are appropriate. In this respect, the location information provided with a user-specified query in act 203 may be at any degree of specificity. For example, the location data may only indicate the location of a cell tower with which the device communicates (and be accurate to within about 2,000 meters), may identify a rough location as supplied by Global Positioning Services (GPS) satellites (and be accurate to within about 100 meters), or identify a more exact location identified by GPS (and be accurate to within about 10 meters). Different searches may require different degrees of precision in location data to be performed. For example, if a user-specified query includes the words "subway near me," and the accurate location provided with the query is only accurate to within about 2,000 meters, then more specific or accurate location data may be desired before a response to the query may be given with a desired degree of accuracy.

Figure 13:
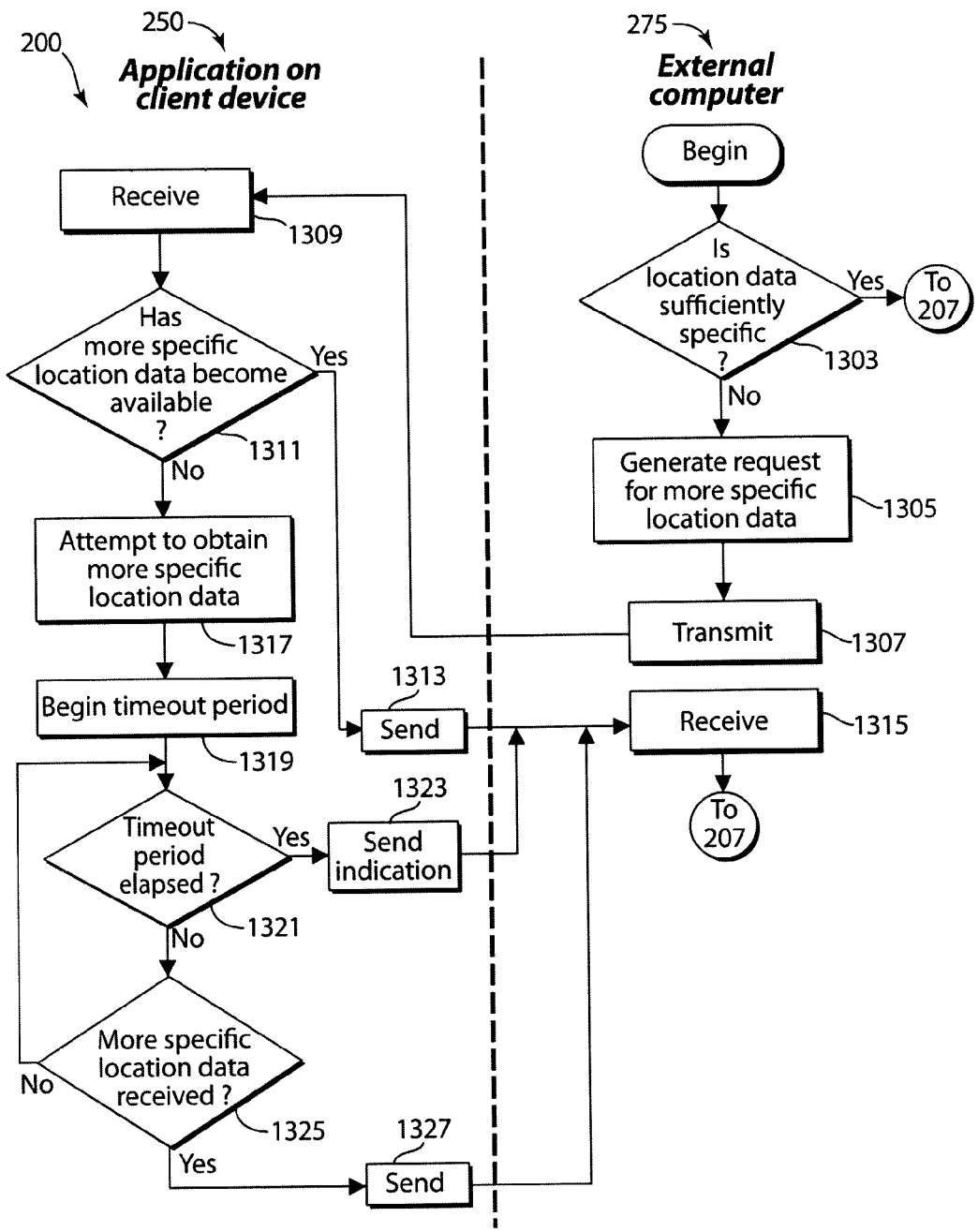
FIG. 13 is a flowchart of an illustrative process for determining whether sufficiently accurate location data is available for use.

An example process 1300 via which an external computer 275 may determine whether location data supplied by a client device is sufficiently specific, and if not may request more specific location data, is shown in FIG. 13. Example process 1300 may, for example, be performed after a user-specified query is received by external computer 275 (e.g., after act 205 in example process 200, and prior to or after act 207).

At the start of example process 1300, external computer 275 determines whether the location data received is specific enough in act 1303. This determination may be made in any of numerous ways, based on any of numerous criteria. For example, as noted above, external computer 275 may make this determination based upon analyzing the content of the user's query (e.g., to determine whether the user is searching for location-specific information), based on predefined specificity requirements of one or more particular search engines identified as those to which a representation of the query is to be submitted, immediately upon receiving the query (e.g., the external computer may request location data for all queries be provided at at least at a threshold level of granularity), or in any other suitable fashion.

If it is determined that the location data is sufficiently specific, then example process 1300 terminates by proceeding to act 207 (FIG. 2). If it is determined that the location data is not sufficiently specific, then example process 1300 proceeds to act 1305, wherein a request for more specific location information is generated, and sent to the client device in act 1307.

The client device receives the request in act 1309, and in act 1311 determines whether more specific location data than that which was initially provided is available. More specific location information may have become available for any of numerous reasons. For example, when the user-specified query was initially submitted to the external computer in act 203, the client device may have been in the process of acquiring more specific location data (e.g., from its GPS system), and that information may now be available. If more specific location data is available, then example process 1300 proceeds to act 1313, wherein the information is sent to external computer 275. The information is received by the external computer in act 1315, and example process 1300 terminates by proceeding to act 207. In act 207, the process of FIG. 2 may employ the more specific location data in any suitable way, one example of which includes identifying one or more search engines to which a user-specified query should be submitted.

If it is determined in act 1311 that more specific location data has not become available, then example process 1300 proceeds to act 1317, wherein the client device attempts to obtain more specific information. For example, act 1317 may include client device 250 attempting to activate its GPS system, if one is available and not already activated. Client device 250 then begins a predetermined timeout period in act 1319. In this respect, the timeout period may be established to ensure that only a predetermined period elapses before the client device either obtains more specific location data and sends it to external computer 275, or informs external computer 275 that more specific location data is not available.

Example process 1300 then proceeds to act 1321, wherein it is determined whether the timeout period has elapsed. If not, a determination is made in act 1325 of whether more specific location data has been received in response to the request issued in act 1317. If not, the process returns to act 1321, and then continues as described above until either the timeout period expires or more specific location data is received. If the timeout period elapses, then the client device sends an indication that more specific location data is not available in act 1323. If more specific location data is obtained, then the client device sends the more specific data to the external computer in act 1327. The external computer receives in act 1315 either the indication that more specific data is not available or more specific data, and then process 1300 proceeds to act 207, as described above with reference to FIG. 2. For example, act 207 may employ the more specific location data sent in act 1327, or the indication that more specific location data is not available sent in act 1323, in identifying one or more search engines to which a user-specified query should be submitted.

It should be appreciated that example process 1300 is but one example of a technique which may be employed to obtain specific location data, and that such data may be obtained using any suitable technique.

The availability or absence of specific location data may drive any of numerous types of system behavior. For example, for certain types of queries, the absence of sufficiently specific location data may alter the search engines to which a user-specified query is submitted. Using the example "subway near me" query to illustrate, if the only location data that is available is accurate to within 2,000 meters, then the query may not be submitted to a search engine that provides access to map data, since any map generated may not provide information useful to the user. Rather, the query may instead, for example, be submitted to a search engine provided by a public transit authority website and one or more general-purpose search engines, so that the user may locate a nearby subway station using information provided by those information sources rather than having one located automatically based on location data.

Referring again to FIG. 2, after the external computer has generated information in act 209, example process 200 proceeds to act 211, wherein external computer 275 transmits the generated information to client device 250. This may be performed in any suitable way, using any suitable communications infrastructure and/or technique(s). Example process 200 then proceeds to act 213, wherein client device 250 receives the instructions.

It should be appreciated that although example process 200 illustrates external computer 275 determining the type(s) of information the user seeks and/or action(s) or behaviors the user wishes to perform, embodiments of the invention are not limited to being implemented in this manner. For example, client device 250 may alternatively perform any one or more of the acts shown in FIG. 2 as being performed by external computer 275, including performing automated speech recognition on a user-specified query, identifying the type(s) of information the user seeks and/or action(s) the user wishes to perform (e.g., by performing example process 1200 of FIG. 12), generating search queries to be submitted to various search engines, and/or other acts. Embodiments of the invention are not limited to being implemented using any particular architecture.

Figure 8:
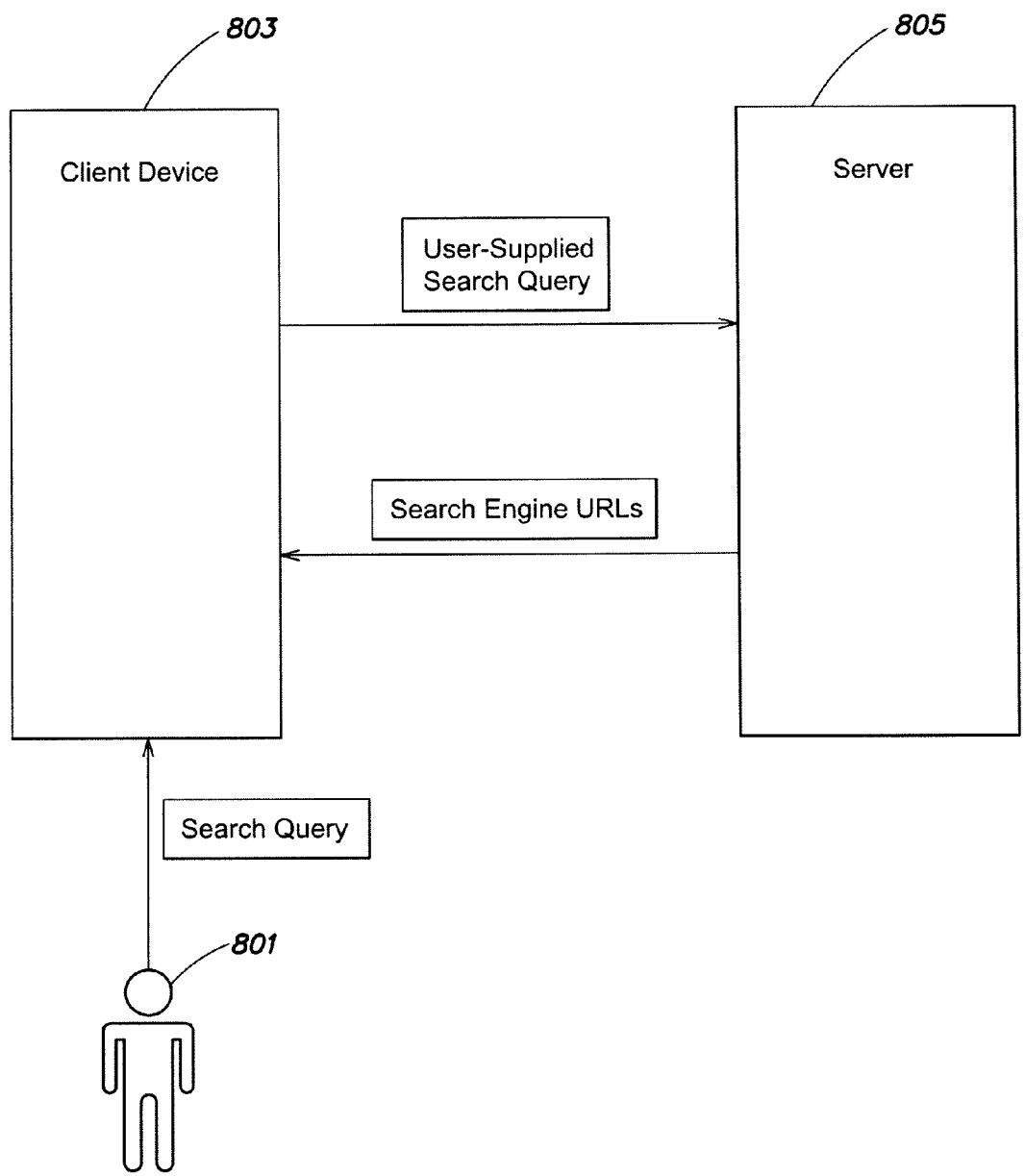
FIG. 8 is a block diagram of a server that instructs a client device which search engines to query in response to receiving a user-supplied search query, in accordance with some embodiments.

Another example of a mode of processing in which an external computer facilitates a search by a client device is depicted in FIG. 8. In this example, an application program executing on client device 803 receives a search query from a user 801, which may be in text format, audio format, or some other format. Client device 803 passes the user-supplied search query to server 805, which determines which search engines to query, generates URLs for the determined search engines with the appropriate search strings, and returns the URLs to the application program on client device 803. However, in other embodiments, the determination as to which search engines to query may be made on the client device, and/or the client device may generate URLs to be used with different search engines. In embodiments in which the determination as to which search engines to query is made on the server, the server may instruct the client device which search engines to query and the client device may generate the URLs for these search engines.

As noted above, in situations wherein the user-specified query is a voice query provided as audio data, server 805 may, in some embodiments, perform automated speech recognition on the audio data to generate a recognition result and determine which search engines to query based on the recognition result. In other embodiments, automated speech recognition may be performed on client device 803, and the recognition result, rather than the audio data, may be sent from client device 803 to server 805. Other configurations are possible, including ones in which ASR operations are distributed in any suitable manner between the client device and the server.

In some embodiments, the determination of which search engines to query using any of the above-discussed criteria may be made by the application program executing on the client device. In other embodiments, the determination of which search engines to query using the above-discussed criteria may be made by a computer (e.g., server 805 in FIG. 8) external to the client device executing the application program, and the external computer may provide information identifying the search engines to be queried to the application program. In other embodiments, the determination may be distributed between the client device and one or more external computers in any suitable way. For example, the application program may determine which search engines to query using information provided to it by the external computer to facilitate the determination.

III. Issuing Queries to Selected Search Engines

Referring again to FIG. 2, after client device 250 receives information (e.g., instructions) generated by external computer 275 in act 213, example process 200 proceeds to act 215, wherein the client device processes the information. Depending on the nature of the information received, this may take any of numerous forms.

Figure 3:
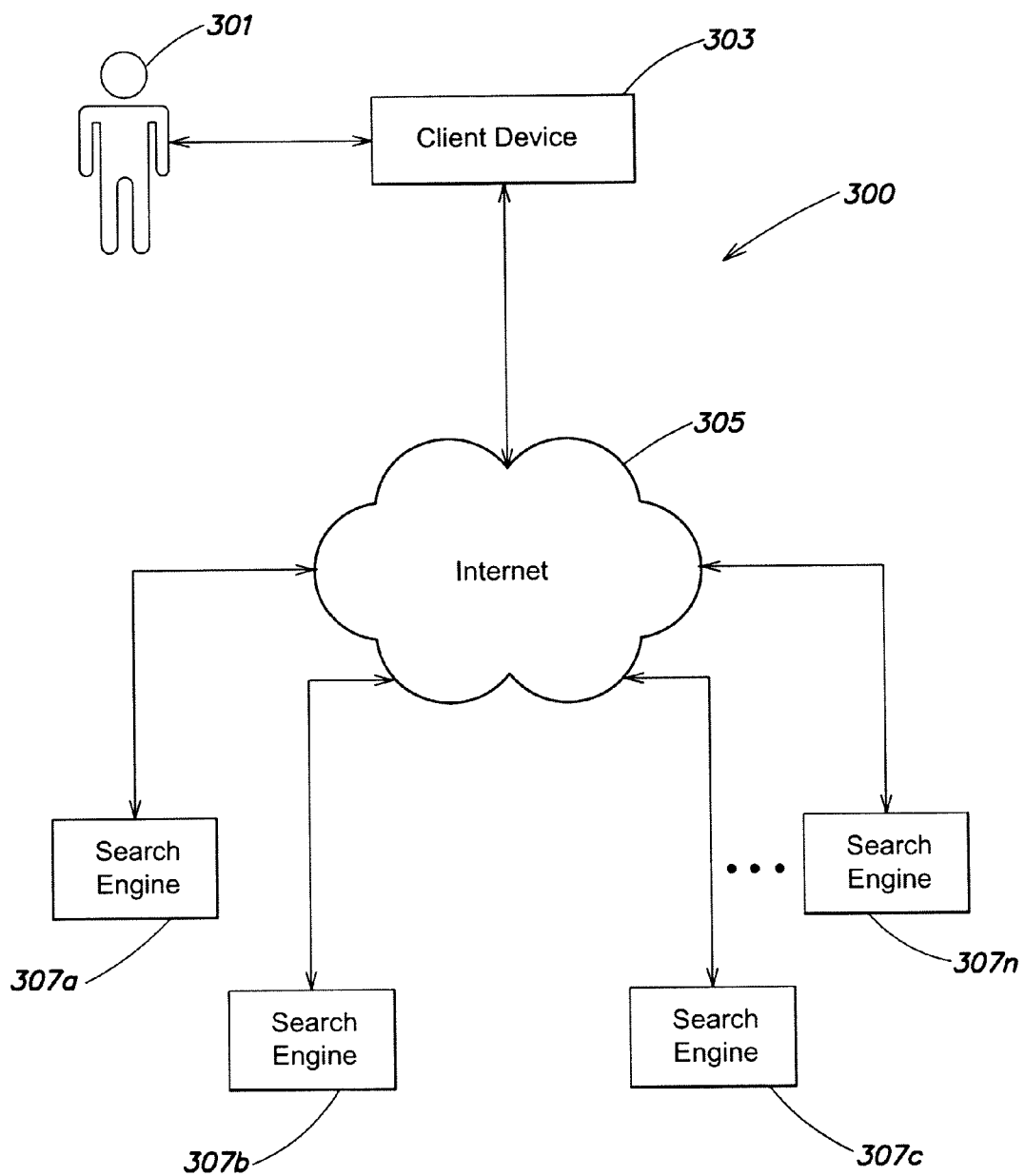
FIG. 3 is a block diagram of a computer environment in which some embodiments may be implemented.

For example, when the information includes search queries for multiple search engines, the processing can include issuing the search queries to the set of search engines identified in act 1215. An example environment 300 in which a client device issues search queries to each of a plurality of search engines is depicted in FIG. 3. In the example shown, user 301 accesses the internet 305 via a client device 303. Search engines 307*a*, 307*b*, 307*c*, . . . , and 307*n* execute on servers that are accessible via the Internet 305. As noted above, the information provided to the client device may include a search query that may, for example, take the form of a URL formatted appropriately for submission to a particular search engine. In some embodiments, the URL may include an encoded representation of the original user-specified query, and/or may include any other suitable form(s) of information.

It should be appreciated that although the client device issuing search queries may have certain advantages, embodiments of the invention are not limited to such an implementation. In this respect, issuing search queries from the client device may provide the advantage that the search engines that are queried do not receive a large volume of queries from the same server or IP address. As explained above, if the server were issuing queries to the search engine on behalf of a large number of clients, the search engines being queried may receive a very large number of queries from a single source, and may perceive this behavior as a single user issuing an enormous number of search queries to the search engine. Many search engine operators would consider this behavior to be an abuse of the search engine service and/or a potential denial of service attack and would take action to block search queries to their search engines from a source issuing such a large number of queries. By issuing the search queries from the client device, the search engines may perceive the queries as being issued from the client device that caused them to be issued, and may treat the issuance of such queries as normal user behavior.

However, embodiments of the invention are not limited to being implemented in this manner. For example, in embodiments in which the URLs or queries are generated by a computer external to the client device, that external computer may instead issue the queries (or a portion of the queries), receive the search results from the search engines to which queries were issued, and return search results to the client device. Any of numerous implementations are possible.

In some embodiments, a search query may not be submitted to a search engine, but rather to an API provided by a search engine designed to provide content formatted for processing by one or more native controls on a client device. In this respect, the inventors have recognized that content formatted for processing by native controls may, in some instances, load faster and provide a superior user experience than markup language (e.g., HTML) content supplied by some search engines in response to search queries. For example, an API made available by a search engine may respond to a search query with results formatted in JavaScript, which native controls on a client device may be configured to process to render a user display. Of course, embodiments of the invention are not limited to employing JavaScript, as any suitable representation enabling processing by native controls on a client device may alternatively be used.

As noted above, executing instructions in act 215 is not limited to issuing queries to one or more identified search engines. For example, act 215 may include initiating one or more native actions, specified in the information received from the external computer, on client device 250. Any suitable action(s) may be initiated and/or performed. For example, a native action may include the launch of an application resident on the client device, as described above.

As noted above, the information processed in act 215 may specify that a native action be initiated and/or performed in any suitable fashion. For example, instructions may specify that an application be executed in such a manner that if it is stopped by the user, the client device returns immediately to the search application on the client device that received the user's query, so that search results may be presented to the user (e.g., as a backup option to the execution of the application in case the user's intent was not correctly informed). Alternatively, the instructions may specify presenting the search results along with an option to launch a native application, as embodiments of the invention that relate to performing a native action may be implemented in any suitable way.

The information processed in act 215 may specify that any of a set of alternative native actions be initiated. For example, the information may specify that one or more of a collection of potential native actions be initiated, depending on the capabilities of the device. For example, rather than specifically identifying a particular media player application to be launched, the information may specify a list of media player applications. The client device may determine whether any of the media player applications in the list is installed on the device, and if a named media player application is determined to be installed, that application may be launched. If multiple of the listed media players are present, the information from the external computer may specify a prioritization scheme based on any suitable criteria, and the client device may launch the highest priority media player that is resident, or the client device may be free to select any of the media players specified. Thus, embodiments of the invention are not limited to employing an ordered list, as any suitable technique for identifying one or more native actions to be initiated and/or performed may be employed.

If an ordered list is used, the prioritization may be determined in any suitable manner. For example, some embodiments of the invention provide for the prioritized order in which applications are named being influenced by consideration received from one or more providers of applications. For example, a provider may pay to have its application named on a list provided by the external computer before a competitor's application, so that its application will be launched if both reside on the client device. If two application providers both provide compensation, the prioritization between them may be determined in any suitable manner, such as by always giving preference to an application whose provider paid greater compensation, by alternating which application is prioritized in any suitable manner (e.g., in proportion to compensation paid by each), or in any other suitable manner. These techniques are merely examples, as prioritization may be determined in any suitable manner.

IV. Receiving Search Results from Search Engines

At the completion of act 215, example process 200 proceeds to act 217, wherein results are received from each search engine to which a search query was submitted. Search results may be received via any suitable communications infrastructure and/or protocol, as embodiments of the invention are not limited in this respect.

As noted above, search results may be formatted in any of a variety of ways. For example, some search engines may provide results as a hypertext markup language (HTML) web page including a list of hyperlinks to the content and/or web pages identified as relevant to the search query. Other search engines may provide results in a format (e.g., JavaScript notation) which allows native controls on the device to be used to process the results for display. Other search engines may provide results in other formats. It should be appreciated that all search results received need not be in the same format, as multiple result formats may be received and displayed.

It should also be appreciated that the example mode of processing shown in FIG. 2 (wherein client device 250 issues search queries, and receives results from the search engines to which the queries are submitted) is merely one example, and that numerous other implementations are possible. For example, in embodiments of the invention in which an external computer (e.g., server 605 in FIG. 6) issues search queries to search engines, each search engine may provide its results to the external computer, and the external computer may provide these results to the client device. Embodiments of the invention are not limited to being implemented in any particular way.

V. Displaying Search Results

At the completion of act 217, example process 200 proceeds to act 219, wherein results are displayed. The results may, for example, include search results generated by search engines to which search queries were submitted, the results of initiating a native action, and/or any other suitable information. In some embodiments, results may be displayed on a display device that is integrated with or coupled to the client device. The results may be displayed in any of a variety of formats and may be presented in any of a variety of possible ways.

In some embodiments, search results returned from search engines that provide search results as an HTML web page may be displayed by rendering the HTML code in the web page. This is different from the displayed results from metasearch engines such as the above-discussed Dogpile™ metasearch engine, which do not render the HTML code received from a search engine, but rather extract links from this HTML code and generate new HTML code to display the extracted links.

For search results that are not received in HTML format, HTML code may be automatically generated to display the received search results, and these search results may be displayed by rendering the automatically generated HTML code.

As noted above, the search engines for which results are displayed may include one or more general-purpose search engines and/or one or more site-specific search engines. As such, the search results displayed in response to one user-specified query may have been returned by each of multiple different search engines (one or more of which may be a general-purpose search engine, and one or more of which may be a site-specific search engine).

In some embodiments, the search results returned by each search engine may be visually separated from search results returned by other search engines, so that it is clear to the user viewing the search results which search engine provided each set of search results. In addition, in some of such embodiments, the order of the list of search results returned from each search engine may be preserved in the displayed search results for each search engine, such that the user may view how relevant each search engine determined each search result to be in the results returned.

Search results from each search engine may be visually separated in any of a variety of possible ways. For example, search results from multiple search engines may be displayed concurrently on the display but separated by columns, lines, or in some other way. In some embodiments, only one of the search engines' search results may be displayed on the display at any given time, and the user may control which of the search engines' search results are displayed (e.g., by selecting an icon, button, or other user interface element).

In some embodiments, search results may be displayed using a carousel metaphor, in which the carousel has a plurality of slots, each slot corresponding to one of the search engines from which search results were received. User selection of one of the slots of the carousel may, for example, cause results returned by the corresponding search engine to be displayed. FIGS. 10A and 10B show screenshots of example displays 1000A-1000B which employ a carousel metaphor. Example displays 1000A-1000B may, for example, be presented by the Dragon Search™ application offered by Nuance Communications, Inc., of Burlington, Mass. for use with the iPhone™ device offered by Apple Computer, Inc. of Cupertino, Calif.

Example display 1000A shown in FIG. 10A presents results generated in response to a first user-specified query, and example display 1000B shown in FIG. 10B presents results generated in response to a second user-specified query. Each of example displays 1000A-1000B includes a carousel having multiple slots, with each slot being assigned a different search engine or native action. Thus, in FIG. 10A, example display 1000A comprises carousel 1001A which includes slots 1020A, 1025A, 1030A, 1035A and 1040A, each of which corresponds to a different search engine or native action. In FIG. 10B, example display 1000B comprises carousel 1001B which includes slots 1020B, 1025B, 1030B, 1035B and 1040B, each of which corresponds to a different search engine or native action. In the examples shown, the search engine or native action to which each slot corresponds is identified via an icon that identifies the search engine or native action, although any suitable manner of identification (e.g., symbol, text, image, etc.) may be employed.

The examples shown in FIGS. 10A-10B depict search engines and/or native actions assigned to slots in a carousel that are chosen based at least in part on the content of a user-specified query. In FIG. 10A, example display 1000A (FIG. 10A) shows via query field 1009A that the user-specified query is "Legal Seafood Boston Mass." A set of search engines and/or native actions are chosen based at least in part on the content of this query, and assigned to each of slots 1020A, 1025A, 1030A, 1035A and 1040A. As noted above, in some embodiments, choosing the set of search engines and/or native actions may involve determining one or more information categories to which the query relates, and then employing a predefined mapping (an example of which is shown in Table 1, above) to identify a set of search engines and/or native actions that make available information relevant to the identified one or more information categories. In the example shown in FIG. 10A, the user-specified query "Legal Seafood Boston Mass." is associated with the "restaurants" and "location" information categories, so that a map application is assigned to slot 1030A, a search engine offered by the "Yelp" restaurant review website is assigned to slot 1035A, a service providing access to telephone numbers included in results generated by a general-purpose search engine is assigned to slot 1025A, a search engine offered by the "Wikipedia" reference website is assigned to slot 1040A, and a search engine provided by the "Twitter" social networking website is assigned to slot 1020A.

In example display 1000B, shown in FIG. 10B, query field 1009A indicates that the user-specified query is "Avatar." As in example display 1000A, a set of search engines and/or native actions is chosen based at least in part on the content of this query, and assigned to slots 1020B, 1025B, 1030B, 1035B and 1040B. In this example, the user-specified query "Avatar" is associated with the "Movies" and "Title [not in theaters]" information categories, so that the set assigned to slots 1020B, 1025B, 1030B, 1035B and 1040A (as defined by the example mapping provided by Table 1) includes a search engine offered by the "IMDB" movie information website assigned to slot 1030B, a search engine offered by the "rottentomatoes" movie review website assigned to slot 1035B, a media player application assigned to slot 1025B, a search engine offered by the "Wikipedia" reference website assigned to slot 1040B, and a search engine provided by the "Twitter" social networking website assigned to slot 1020B.

It should be appreciated from the examples shown in FIGS. 10A-10B that some embodiments of the invention enable the slots in a carousel to be assigned to sets of search engines and/or native actions based on the content of a user-specified query, rather than the slots being assigned to a static set regardless of the query that is received. As such, the assignment of a search engine or native action to a carousel slot in some embodiments may be considered "dynamic" in that it is based at least in part on the content of a user's query. It should be appreciated, however, that some embodiments of the invention may not assign all slots dynamically. For example, in some embodiments of the invention, one or more search engines and/or native actions assigned to slots may be statically defined, and others may be dynamically determined. For example, one or more slots in a carousel may each be assigned a predefined search engine or native action, and one or more other slots may each be assigned dynamically. The assignment of a search engine or native action to a slot in a carousel may be performed in any suitable way, as embodiments of the invention are not limited to any particular manner of implementation.

Example display 1000A includes area 1005A in which results generated by a selected search engine or native action are displayed. In the example shown, a user selects a search engine or native action to cause its results to be displayed in area 1005A by providing input to (e.g., tapping if a client device includes a touch display, and/or providing any other suitable form of input) a corresponding icon shown in a carousel slot. In this respect, example display 1000A includes indicator 1007A to indicate the slot in the carousel 1001A selected for display. In the example shown, the indicator 1007A indicates that results generated by the map application identified by the icon in slot 1030A are displayed in area 1005A. In FIG. 10B, indicator 1007B indicates that results generated by the search engine provided by the "IMDB" website identified by the icon shown in slot 1030B are displayed in area 1005B.

In some embodiments, the placement of particular search engines or native actions in particular carousel slots may be determined dynamically (e.g., based on an estimated similarity between the content of the query (and/or other information) and content made available by a search engine or native action). For example, some embodiments of the invention may provide for results generated by search engines providing access to a specific type of information that it is believed the user seeks to be presented more prominently than results generated by search engines providing access to more general types of information. For example, a most aggressive specific search engine option (e.g., provided by a site that makes available specialized information relating to the user-specified query) may be presented most prominently, and other less aggressive specific search engine options (e.g., providing less specialized information, but potentially encompassing the type of information the user seeks) may be presented less prominently.

Displaying some information more prominently than other information may be accomplished in any of numerous ways. In the examples shown in FIGS. 10A-10B, information generated by a particular search engine or native application may be displayed more prominently than other information by allocating that information to a slot in the carousel that has a more prominent appearance than others. For example, the slot may be one which is displayed upon the search results initially being presented so that the user need take no action (e.g., scrolling the carousel) to view them, one which is justified with respect to the display (e.g., centered, left-justified, right-justified), and/or defined using any other criteria. In the example display 1000B shown in FIG. 10B, results generated by the "IMDB" search engine, identified as those to be displayed most prominently, are shown in slot 1030B, which is centered with respect to the display. In addition, in this example, slot 1030B is shown immediately upon results being presented, as indicated by indicator 1007B. In the example display 1000A shown in FIG. 10A, information generated by the map application, identified as that which is to be displayed most prominently, are shown in slot 1030A, which is centered with respect to the display and shown immediately as indicated by indicator 1007A.

In some embodiments (e.g., those in which a user may specify a search engine to be queried), a user may configure which search engines are to be allocated to which slots in the carousel. In addition, in some embodiments, the allocation of carousel slots to particular search engines may be made based on the results returned by the search engines. For example, if one of the search engines selected at act 203 of process 200 as a search engine to be queried does not return any search results or returns an indication that no search results were found as a result of the query, a slot in the carousel may not be allocated for that search engine, and the page returned from that search engine may not be displayed to the user.

Not all of the results returned from a particular search engine in response to a query may fit in area 1005 at once. Thus, in some embodiments, a user may be provided with the capability to scroll up and down the list of search results and/or adjust the zoom level at which results are displayed so as to adjust which portion of the search results are displayed in area 1005.

As shown in FIGS. 10A-10B, in some embodiments, not all of the carousel slots may be able to be displayed at one time, owing to the size of the display. For example, in FIG. 10A, slots 1020A and 1040A are only partially displayed. In addition, carousel 1001A may include slots that are not displayed at all in example display 1000A. As such, some embodiments of the invention enable a user to adjust which slots of the carousel are displayed by shifting the carousel to the right side and/or to the left side of the display. This may be accomplished in any of a variety of ways. For example, the user may drag the carousel in one direction using a pointer device such as a mouse, or drag the carousel in one direction using his or her finger in embodiments in which display 1000 is presented on a touch screen.

In some embodiments, a carousel 1001 may wrap around a display 1000. For example, if the user continuously drags carousel 1001A to the left side of display 1000A, then the slots of carousel 1001A moving the left will move off of the left side of the display and will eventually re-enter the display on the right side. In this respect, dragging carousel 1001A in a particular direction can be thought of as rotating the carousel in that direction.

As noted above, example displays 1000A and 1000B each include a query field 1009 (i.e., example display 1000A includes query field 1009A, and example display 1000B includes query field 1009B). In some embodiments, query field 1009 indicates to a user the query that is the basis for information supplied to a selected search engine or native application for which information is displayed in area 1005. In this respect, it should be appreciated from the description above that, in some embodiments, different representations of a user-specified query may be submitted to different facilities. As such, query field 1009 may display the user-supplied query that is the basis for information submitted to each different search engine or native application in response to that query. Alternatively, the query shown in the field may change with the selection of different slots on the carousel, to show the information submitted to each.

A user may input a search query into field 1009 in any of a variety ways. In some embodiments, a user may provide text input to field 1009 (e.g., via a physical or touch screen keyboard). In some embodiments, a user may provide voice input to field 1009. In the examples of FIGS. 10A-10B, when a user wishes to supply voice input to field 1009, the user may select (e.g., touch) button 1011 and speak his or her search query into a microphone on the client device.

In some embodiments, queries for each of the search engines selected in act 203 may be issued automatically in response to receiving the search query from the user in act 201. In other embodiments, the queries for all or some of the search engines selected in act 203 may not be issued to those search engines until the user provides input requesting to view the search results from those search engines. For example, the search results from some search engines may include a large amount of content. As one example, the search results from a search engine for a web site that hosts video clips may include a thumbnail image of each video included in the list of results. Consequently, transferring the search results from the search engine to the client device or external computer may take a relatively long time. The time taken to transfer the search results may be time that is not well spent if the user does not ever view the search results from that search engine. Thus, in some embodiments, search queries to search engines that return results including bandwidth-intensive content, such as a large number of images, video data, audio data, and/or other bandwidth-intensive content may not be issued automatically in response to receiving a user-supplied search query, while search queries to search engines that return results that do not include bandwidth-intensive content may be issued automatically.

It should be appreciated that the size of the content (or the expected size of the content) of a set of search results is one example of a criterion that may be used to determine whether to issue a search query automatically to a particular search engine or whether to await some user indication before issuing the query to that search engine. Any of a variety of other criteria or combinations of criteria may be used.

Some embodiments of the invention may provide for displaying sponsored content and/or other information in response to a user-specified query. For example, in accordance with some embodiments of the invention, in response to a query being received, a search engine is identified to which to submit a representation of the query. The identifying may be based at least in part on consideration received from an operator of the at least one search engine.

The display of sponsored content may be implemented in any of numerous ways. For example, some embodiments may enable a banner which includes sponsored content on a display. In other embodiments, sponsored content may be displayed within a particular slot on a carousel. In yet other embodiments, the order in which icons are arranged in slots on the carousel may be influenced by consideration received an entity. For example, a search engine provider may pay to have its results displayed more prominently than other search engines' results, such as by displaying the search engine's results in the center slot of the carousel, or by having its results be shown immediately upon any results being made available. The display of sponsored content may be implemented in any of numerous ways, as embodiments of the invention are not limited in this respect.

The inventors have recognized that the type of information a user seeks may be indicative of promotional offers to which the user may be receptive. Thus, in some embodiments, sponsored content may be driven by the content of a user's query. For example, if a user's query indicates that he/she seeks information on a particular restaurant of a particular category of restaurant, then another restaurant in that category may pay to have one of the slots in the carousel show information on its location(s), reviews, coupons or other promotional offer.

Alternatively, sponsored content may be driven by information other than the content of a user's query. For example, sponsored content may be driven by such auxiliary information as the location of a client device, previous searches and/or browsing activity performed by the user, demographic information on the user, the speed at which the device is moving (which may indicate whether and what type of vehicle the device is travelling in), and/or other information. For example, if a user-specified query indicates that the user is looking for information on nearby restaurants, then a restaurant located close to the user's current location may have information presented on the display based, at least in part, on the restaurant having paid to have its information displayed to such users. Any of numerous implementations are possible.

VI. Monitoring User Actions

As discussed above, when search results from one or more search engines are displayed to a user, the user may view some or all of the lists of search results, and may access hyperlinks to view web pages or content identified in the lists of results.

In some embodiments, the application program may monitor user actions taken with respect to the search results and may store information about the monitored user actions. The monitored actions can take any suitable form, as the aspect of the invention relating to monitoring user actions is not limited in this respect. In some embodiments, the monitored user actions may include, for example, which search engines' search results the user viewed and what web pages and/or content the user accessed.

The information describing the monitored user actions may be subsequently used to update language models used in automatic speech recognition of voice queries, determine which search engines to query in response to subsequent user queries, determine how search engine results are to be presented (e.g., determine which carousel slot is the default slot and/or in what order the search engines are to be positioned in the carousel slots), and/or to facilitate various other aspects of querying search engines, displaying search engine results and/or launching native behaviors.

In embodiments in which a computer external to the client device uses such information to facilitate any of the above-discussed aspects of querying a search engine or launching native behavior, the client device may send the monitored information to the external computer. The external computer may associate this information with the client device, the user of the client device, and/or the network address from which the information was sent, and may store it for subsequent use.

VII. Additional Implementation Detail

Figure 11:
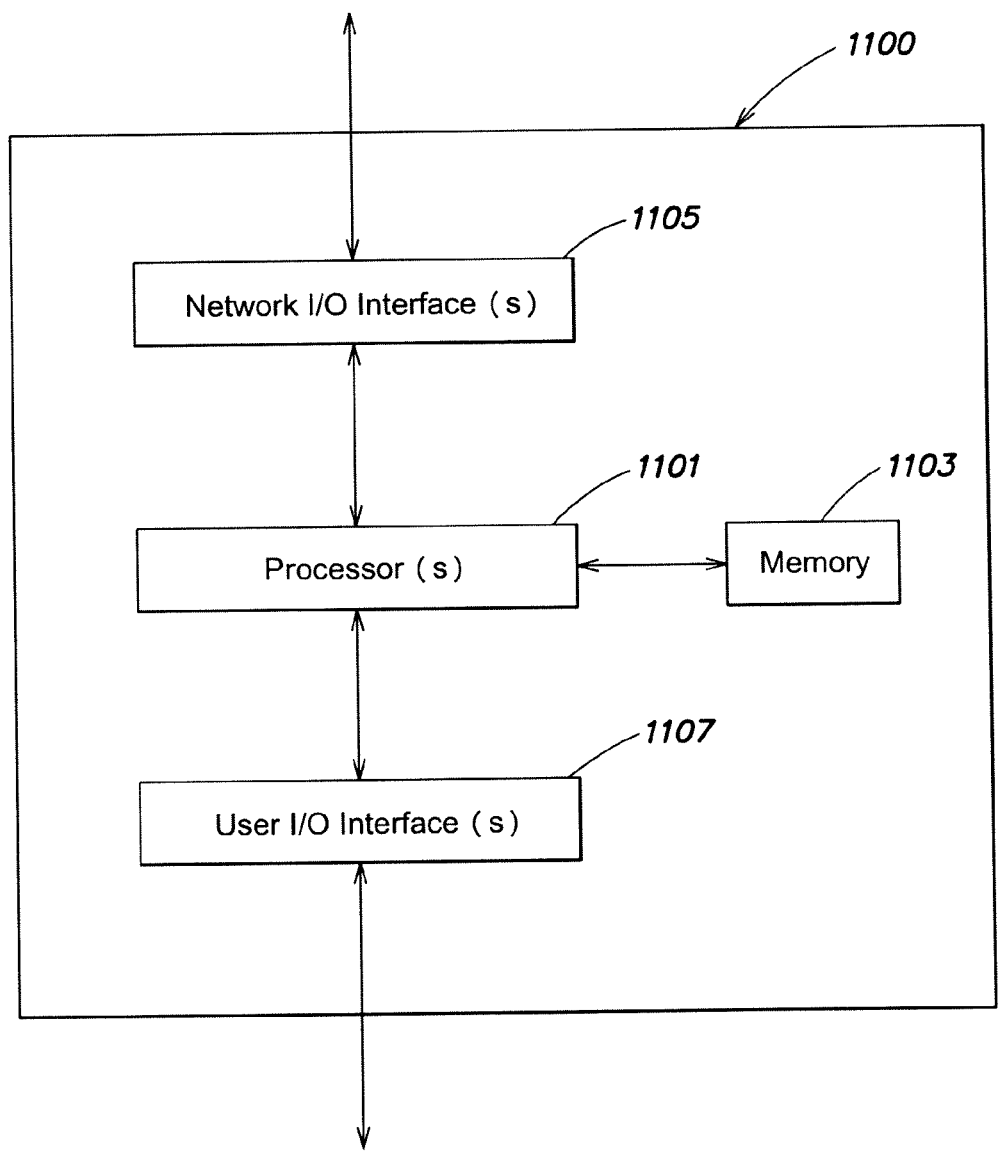
FIG. 11 is a block diagram of an illustrative computing device on which aspects described below may be implemented.

The above discussed computing devices (e.g., client devices, servers, external computers, and/or any other above-discussed computing devices) may be implemented in any of a variety of ways. FIG. 11 is a block diagram an illustrative computing device 1100 that may be used to implement any of the above-discussed computing devices.

The computing device 1100 may include one or more processors 1101 and one or more tangible, non-transitory computer-readable storage media (e.g., memory 1103). Memory 1103 may store, in tangible non-transitory computer-readable storage media computer instructions that implement any of the above-described functionality. Processor(s) 1101 may be coupled to memory 1103 and may execute such computer instructions to cause the functionality to be realized and performed. Computing device 1100 may also include a network input/output (I/O) interface 1105 via which the computing device may communicate with other computers (e.g., over a network), and may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of various embodiments of the present invention comprises at least one tangible, non-transitory computer-readable storage medium (e.g., a computer memory, a floppy disk, a compact disk, and optical disk, a magnetic tape, a flash memory, circuit configurations in Field Programmable Gate Arrays or other semiconductor devices, etc.) encoded with one or more computer programs (i.e., a plurality of instructions) that, when executed on one or more computers or other processors, performs the above-discussed functions of various embodiments of the present invention. The computer-readable storage medium can be transportable such that the program(s) stored thereon can be loaded onto any computer resource to implement various aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method, comprising:
    using at least one computer to perform acts of:
    (A) receiving a query from a mobile device configured to communicate over a wireless communication medium with the at least one computer, the query comprising content, the content comprising at least a first word and a second word;
    (B) determining a semantic meaning of the query at least in part by identifying a first semantic tag indicating a meaning of at least the first word and a second semantic tag indicating a meaning of at least the second word, and determining the semantic meaning of the query based at least in part on at least one information category associated with the first and second semantic tags;
    (C) determining, based at least in part on the determined semantic meaning of the query and without prompting a user of the mobile device for any additional input, that an application is to be launched on the mobile device; and
    (D) in response to performing (C), causing the mobile device to launch the application using at least some information determined from the content of the query.

2. The method of claim 1, wherein the act (C) further comprises identifying at least one general-purpose Internet search engine to which to submit a representation of the query, and further comprising an act (E) of issuing instructions to the mobile device to issue a query to the at least one general-purpose Internet search engine.

3. The method of claim 1, wherein the act (C) comprises determining that any of a plurality of applications is to be launched on the mobile device, and the act (D) comprises issuing at least one instruction to the mobile device instructing the mobile device to determine whether any of the plurality of applications is on the mobile device, and to launch at least one of the plurality of applications determined to be on the mobile device.

4. The method of claim 3, wherein the at least one instruction defines a sequence in which the mobile device is to determine whether any of the plurality of applications is on the mobile device.

5. The method of claim 4, wherein the sequence is defined based at least in part on consideration received by a provider of one of the plurality of applications.

6. The method of claim 1, wherein the act (D) comprises issuing at least one instruction to the mobile device defining a type of application to be launched on the mobile device.

7. The method of claim 1, wherein the act (D) comprises issuing at least one instruction to the mobile device to launch a specific application known to be installed on the mobile device.

8. A method, performed by a mobile device configured to communicate over a wireless communication medium with at least one computer, the method comprising acts of:
    (A) receiving a free-form query from a user, the query comprising content including at least a first word and a second word;
    (B) transferring a representation of the query to the at least one computer;
    (C) in response to the transferring, receiving from the at least one computer at least one instruction to launch an application on the mobile device, the at least one instruction generated based on a semantic meaning of the query determined at least in part by identifying a first semantic tag indicating a meaning of at least the first word and a second semantic tag indicating a meaning of at least the second word in the query, and determining the semantic meaning of the query based at least in part on at least one information category associated with the first and second semantic tags; and
    (D) launching the application in response to receiving the at least one instruction.

9. The method of claim 8, wherein the application is a first application, wherein the act (C) comprises receiving at least one instruction specifying a plurality of applications, and wherein the act of launching the first application comprises determining that the first application is among the plurality of applications specified and resides on the mobile device.

10. The method of claim 9, wherein the act (C) comprises receiving at least one instruction specifying the plurality of applications in a prioritized order, and wherein the act (D) comprises determining that the first application is highest in the prioritized order of the plurality of applications that reside on the mobile device.

11. The method of claim 8, wherein the query received in the act (A) is a voice query, and the act (B) comprises transferring a representation of the query to the at least one computer for automatic speech recognition.

12. The method of claim 11, wherein (B) comprises transferring the representation of the query to the at least one computer via one or more of the Internet, a public network, a wide area network and a wireless network.

13. The method of claim 8, wherein the act (C) comprises receiving from the at least one computer an instruction defining a type of application to be launched on the mobile device, and wherein the method further comprises:
(E) identifying an application of the identified type to launch.

14. The method of claim 8, wherein the representation of the query transferred in (B) is a first representation, and wherein the method further comprises an act of:
receiving, in response to transferring the first representation of the query in (B), an instruction from the at least one computer to issue a second representation of the query to at least one general-purpose Internet search engine.

15. At least one non-transitory computer-readable medium having instructions thereon which, when executed by at least one computer, cause the at least one computer to perform a method comprising acts of:
(A) receiving a query from a mobile device configured to communicate over a wireless communication medium with the at least one computer, the query comprising content, the content comprising at least a first word and a second word;
(B) determining a semantic meaning of the query at least in part by identifying a first semantic tag indicating a meaning of at least the first word and a second semantic tag indicating a meaning of at least the second word, and determining the semantic meaning of the query based at least in part on at least one information category associated with the first and second semantic tags;
(C) determining, based at least in part on the determined semantic meaning of the query and without prompting a user of the mobile device for any additional input, that an application is to be launched on the mobile device; and
(D) in response to performing (C), causing the mobile device to launch the application using at least some information determined from the content of the query.

16. The at least one non-transitory computer-readable medium of claim 15, wherein the act (C) further comprises identifying at least one general-purpose Internet search engine to which to submit a representation of the query, and further comprising an act (E) of issuing instructions to the mobile device to issue a query to the at least one general-purpose Internet search engine.

17. The at least one non-transitory computer-readable medium of claim 15, wherein the act (C) comprises determining that any of a plurality of applications is to be launched on the mobile device, and the act (D) comprises issuing at least one instruction to the mobile device instructing the mobile device to determine whether any of the plurality of applications is on the mobile device, and to launch at least one of the plurality of applications determined to be on the mobile device.

18. The at least one non-transitory computer-readable medium of claim 17, wherein the at least one instruction defines a sequence in which the device is to determine whether any of the plurality of applications is on the mobile device.

19. The at least one non-transitory computer-readable medium of claim 18, wherein the sequence is defined based at least in part on consideration received by a provider of one of the plurality of applications.

20. The at least one non-transitory computer-readable medium of claim 15, wherein the act (D) comprises issuing at least one instruction to the mobile device defining a type of application to be launched on the mobile device.

21. The at least one non-transitory computer-readable medium of claim 15, wherein the act comprises issuing at least one instruction to the mobile device to launch a specific application known to be installed on the mobile device.

22. At least one non-transitory computer-readable medium having instructions recorded thereon which, when executed by a mobile device configured to communicate over a wireless communication medium with at least one computer, cause the mobile device to perform a method comprising acts of:
(A) receiving a free-form query from a user, the query comprising content including at least a first word and a second word;
(B) transferring a representation of the query to the at least one computer;
(C) in response to performing (B), receiving from the at least one computer at least one instruction to launch an application on the mobile device, the at least one instruction generated based on a semantic meaning of the query determined at least in part by identifying a first semantic tag indicating a meaning of at least the first word and a second semantic tag indicating a meaning of at least the second word, and determining the semantic meaning of the query based at least in part on at least one information category associated with the first and second semantic tags; and
(D) launching the application in response to receiving the at least one instruction.

23. The at least one non-transitory computer-readable medium of claim 22, wherein the application is a first application, wherein the act (C) comprises receiving at least one instruction specifying a plurality of applications, and wherein the act of launching the first application comprises determining that the first application is among the plurality of applications specified and resides on the mobile device.

24. The at least one non-transitory computer-readable medium of claim 23, wherein the act (C) comprises receiving at least one instruction specifying the plurality of applications in a prioritized order, and wherein the act (D) comprises determining that the first application is highest in the prioritized order of the plurality of applications that reside on the mobile device.

25. The at least one non-transitory computer-readable medium of claim 22, wherein the query received in the act (A) is a voice query, and the act (B) comprises transferring a representation of the query to the at least one computer for automatic speech recognition.

26. The at least one non-transitory computer-readable medium of claim 25, wherein (B) comprises transferring the representation of the query to the at least one computer via one or more of the Internet, a public network, a wide area network and a wireless network.

27. The at least one non-transitory computer-readable medium of claim 22, wherein the act (C) comprises receiving from the at least one computer an instruction defining a type of application to be launched on the mobile device, and wherein the method further comprises an act of:

(E) identifying an application of the identified type to launch.

28. The at least one non-transitory computer-readable medium of claim 22, wherein the representation of the query transferred in (B) is a first representation, and wherein the method further comprises an act of:

receiving, in response to transferring the first representation of the query in (B), an instruction from the at least one computer to issue a second representation of the query to at least one general-purpose Internet search engine.

29. At least one computer, comprising:

at least one processor, programmed to:

receive a query from a mobile device configured to communicate over a wireless communication medium with the at least one computer, the query comprising content, the content comprising at least a first word and a second word;

determine a semantic meaning of the query at least in part by identifying a first semantic tag indicating a meaning of at least the first word and a second semantic tag indicating a meaning of at least the second word, and determining the semantic meaning of the query based at least in part on at least one information category associated with the first and second semantic tags;

determine, based at least in part on the determined semantic meaning of the query and without prompting a user of the mobile device for any additional input, that an application is to be launched on the mobile device; and in response to determining that the application is to be launched on the mobile device, cause the mobile device to launch the application using at least some information determined from the content of the query.

30. The at least one computer of claim 29, wherein the at least one processor is programmed to identify at least one general-purpose Internet search engine to which to submit a representation of the query, and to issue instructions to the mobile device to issue a query to the at least one general-purpose Internet search engine.

31. The at least one computer of claim 29, wherein the at least one processor is programmed to determine that any of a plurality of applications is to be launched on the mobile device, and to issue at least one instruction to the mobile device instructing the mobile device to determine whether any of the plurality of applications is on the mobile device and to launch at least one of the plurality of applications determined to be on the mobile device.

32. The at least one computer of claim 31, wherein the at least one instruction defines a sequence in which the mobile device is to determine whether any of the plurality of applications is on the mobile device.

33. The at least one computer of claim 32, wherein the sequence is defined based at least in part on consideration received by a provider of one of the plurality of applications.

34. The at least one computer of claim 29, wherein the act (C) comprises issuing at least one instruction to the mobile device defining a type of application to be launched on the mobile device.

35. The at least one computer of claim 29, wherein the act (C) comprises issuing at least one instruction to the mobile device to launch a specific application known to be installed on the mobile device.

36. A mobile device configured to communicate over a wireless communication medium with at least one computer, the mobile device comprising:

at least one processor; and an application, executed by the at least one processor, that:

receives a free-form query from a user, the query comprising content including at least a first word and a second word;

transfers a representation of the query to the at least one computer; and in response to transferring the representation for the query, receives from the at least one computer at least one instruction to launch an application on the mobile device, the at least one instruction generated based on a semantic meaning of the query determined at least in part by identifying a first semantic tag indicating a meaning of at least the first word and a second semantic tag indicating a meaning of at least the second word, and determining the semantic meaning of the query based at least in part on at least one information category associated with the first and second semantic tags; and launches the application in response to receiving the at least one instruction.

37. The mobile device of claim 36, wherein the application is a first application, wherein the at least one instruction specifies a plurality of applications, and wherein the launching of the first application comprises determining that the first application is among the plurality of applications specified and resides on the mobile device.

38. The mobile device of claim 37, wherein the at least one instruction specifies the plurality of applications in a prioritized order, and wherein the launching of the first application comprises determining that the first application is highest in the prioritized order of the plurality of applications that reside on the mobile device.

39. The mobile device of claim 36, wherein the query is a voice query, and wherein the application transfers a representation of the query to the at least one computer for automatic speech recognition.

40. The mobile device of claim 39, wherein the application transfers the representation of the query to the at least one computer via one or more of the Internet, a public network, a wide area network and a wireless network.

41. The mobile device of claim 36, wherein the application receives from the at least one computer an instruction defining a type of application to be launched on the mobile device and identifies an application of the identified type to launch.

42. The mobile device of claim 36, wherein the representation of the query is a first representation, and wherein the application receives, in response to transferring the first representation of the query, an instruction from the at least one computer to issue a second representation of the query to at least one general-purpose Internet search engine.

* * * * *